United States Patent

Patterson

[11] Patent Number: 6,012,999
[45] Date of Patent: Jan. 11, 2000

[54] HYDRAULICALLY-OPERATED BICYCLE SHIFTING SYSTEM WITH POSITIVE PRESSURE ACTUATION

[76] Inventor: Richard A. Patterson, 210 Liz La., Georgetown, Tex. 78628

[21] Appl. No.: 08/997,973

[22] Filed: Dec. 24, 1997

[51] Int. Cl.[7] .............................. F16H 9/00; F16H 7/22; F16H 7/08
[52] U.S. Cl. ........................... 474/80; 474/104; 474/110
[58] Field of Search ................... 474/69, 70, 77, 474/78, 79, 80, 81, 82, 83, 101, 103, 104, 110

[56] References Cited

U.S. PATENT DOCUMENTS

| | | | |
|---|---|---|---|
| Re. 30,758 | 10/1981 | Lang | 474/80 |
| 2,508,181 | 5/1950 | May | 74/483 |
| 2,862,401 | 12/1958 | Gwin | 74/489 |
| 3,742,777 | 7/1973 | Mathauser | 74/242.3 |
| 3,919,891 | 11/1975 | Stuhlmuller et al. | 74/217 B |
| 3,929,025 | 12/1975 | Perry | 74/217 B |
| 3,934,492 | 1/1976 | Timbs | 74/740 |
| 4,041,788 | 8/1977 | Nininger, Jr. | 74/217 B |
| 4,061,046 | 12/1977 | Lang | 74/217 B |
| 4,164,153 | 8/1979 | Moritsch et al. | 74/217 B |
| 4,352,503 | 10/1982 | Cotter | 280/238 |
| 4,412,828 | 11/1983 | Darby | 474/81 |
| 4,490,127 | 12/1984 | Matsumoto et al. | 474/110 |
| 4,546,990 | 10/1985 | Harriger | 280/216 |
| 4,571,219 | 2/1986 | Breden et al. | 474/70 |
| 4,605,240 | 8/1986 | Clem et al. | 280/236 |
| 4,684,143 | 8/1987 | Sato | 280/216 |
| 4,693,700 | 9/1987 | Chappell | 474/80 |
| 4,824,420 | 4/1989 | Ramano | 474/80 |
| 4,836,046 | 6/1989 | Chappell | 74/594.2 |
| 4,887,990 | 12/1989 | Bonnard et al. | 474/80 |
| 4,938,324 | 7/1990 | Van Dyke | 188/317 |
| 4,946,425 | 8/1990 | Buhlmann | 474/80 |
| 5,033,991 | 7/1991 | McLaren | 474/78 |
| 5,152,720 | 10/1992 | Browning et al. | 474/80 |
| 5,163,881 | 11/1992 | Chattin | 474/80 |
| 5,213,548 | 5/1993 | Clobert et al. | 474/71 |

(List continued on next page.)

FOREIGN PATENT DOCUMENTS

| | | |
|---|---|---|
| 0120571A1 | of 0000 | European Pat. Off. . |
| 0826591A2 | of 0000 | European Pat. Off. . |
| 19514267A1 | of 0000 | Germany . |
| 3938454A1 | of 0000 | Germany . |
| WO9619376 | of 1996 | WIPO . |

Primary Examiner—Thomas R. Hannon
Assistant Examiner—Matthew A. Kaness

[57] ABSTRACT

A family of new bicycle shifting systems incorporate improved derailleur designs that are controlled by sealed hydraulic actuators. The shifting systems (i) a hydraulically-actuated, manually-powered front and rear derailleur shifting system, (ii) a hydraulically-actuated, power-assisted front and rear derailleur shifting system with manual control, and (iii) a hydraulically-actuated, power-assisted front and rear derailleur shifting system in which the shifting sequence for the rear derailleur is controlled automatically by pedal speed. Each of these shifting systems utilize a totally sealed, inclined linear shifting path. Environmental contaminants are prevented from entering any of the critical derailleur or control elements. The linear, inclined shifting path provides precise chain shifting, more uniform chain wrap on the rear bicycle drive sprockets, and lower chain and sprocket wear. Several different shifting control units are disclosed.

19 Claims, 8 Drawing Sheets

U.S. PATENT DOCUMENTS

| | | | |
|---|---|---|---|
| 5,254,044 | 10/1993 | Anderson | 474/70 |
| 5,261,858 | 11/1993 | Browning | 474/69 |
| 5,266,065 | 11/1993 | Ancarani Restelli | 474/78 |
| 5,354,243 | 10/1994 | Kriek | 474/160 |
| 5,356,348 | 10/1994 | Bellio et al. | 474/80 |
| 5,356,349 | 10/1994 | Browning | 474/78 |
| 5,357,177 | 10/1994 | Fey et al. | 318/3 |
| 5,387,000 | 2/1995 | Sato | 280/216 |
| 5,407,396 | 4/1995 | Gilbert | 474/80 |
| 5,445,567 | 8/1995 | Chattin | 474/78 |
| 5,447,475 | 9/1995 | Socard | 474/69 |
| 5,456,637 | 10/1995 | Chang | 474/78 |
| 5,470,277 | 11/1995 | Romano | 474/70 |
| 5,483,137 | 1/1996 | Fey et al. | 318/560 |
| 5,514,041 | 5/1996 | Hsu | 474/78 |
| 5,538,477 | 7/1996 | Bellio et al. | 474/80 |
| 5,577,969 | 11/1996 | Watarai | 474/78 |
| 5,605,514 | 2/1997 | Driver | 474/70 |
| 5,607,367 | 3/1997 | Patterson | 474/80 |
| 5,620,384 | 4/1997 | Kojima et al. | 474/82 |
| 5,624,336 | 4/1997 | Kojima | 474/82 |
| 5,649,877 | 7/1997 | Patterson | 474/80 |
| 5,653,649 | 8/1997 | Watarai | 474/78 |
| 5,655,982 | 8/1997 | Fyfe | 474/80 |
| 5,688,200 | 11/1997 | White | 474/80 |
| 5,779,581 | 7/1998 | Fujii | 474/82 |
| 5,816,966 | 10/1998 | Yang et al. | 474/82 |

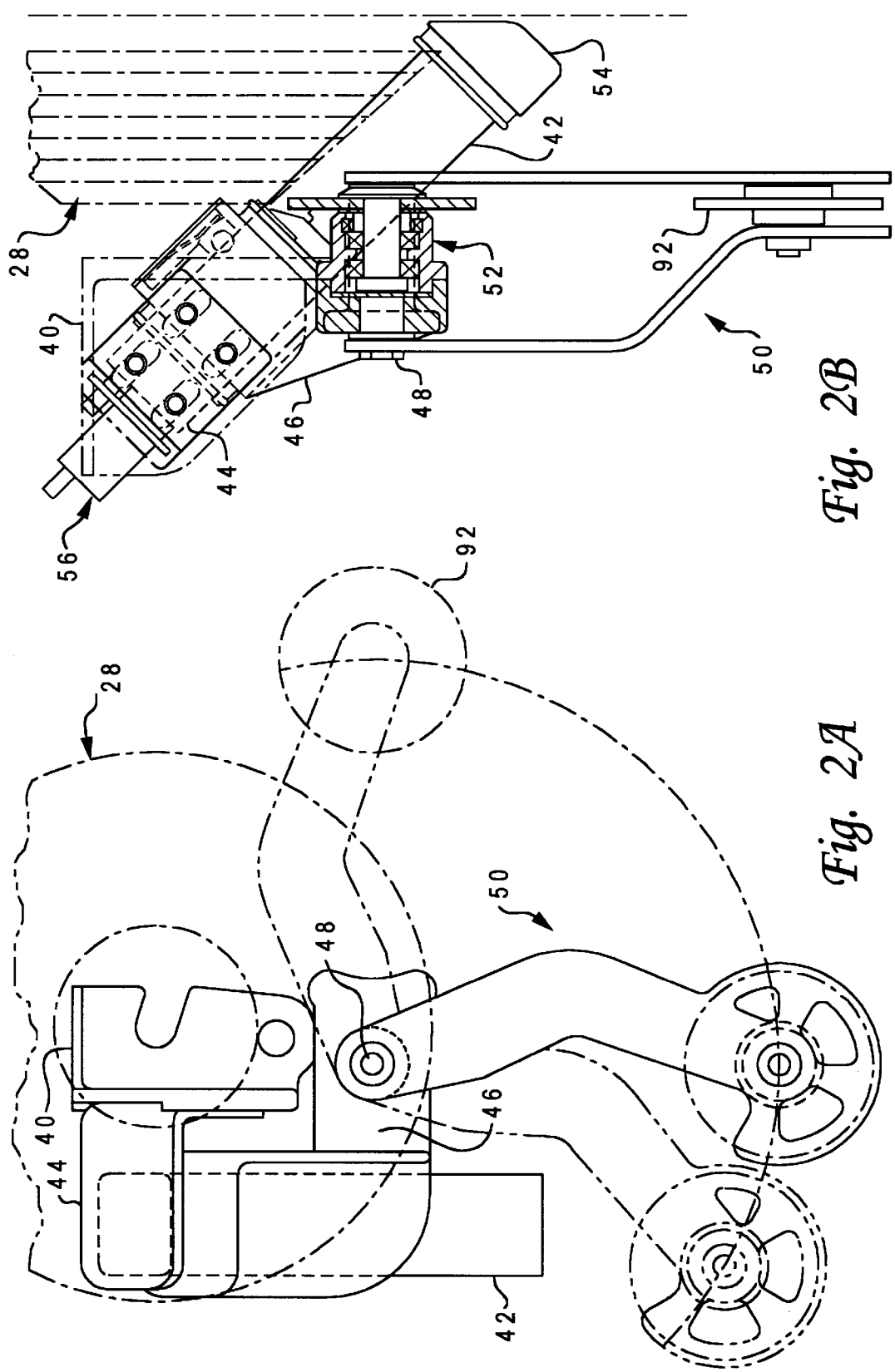

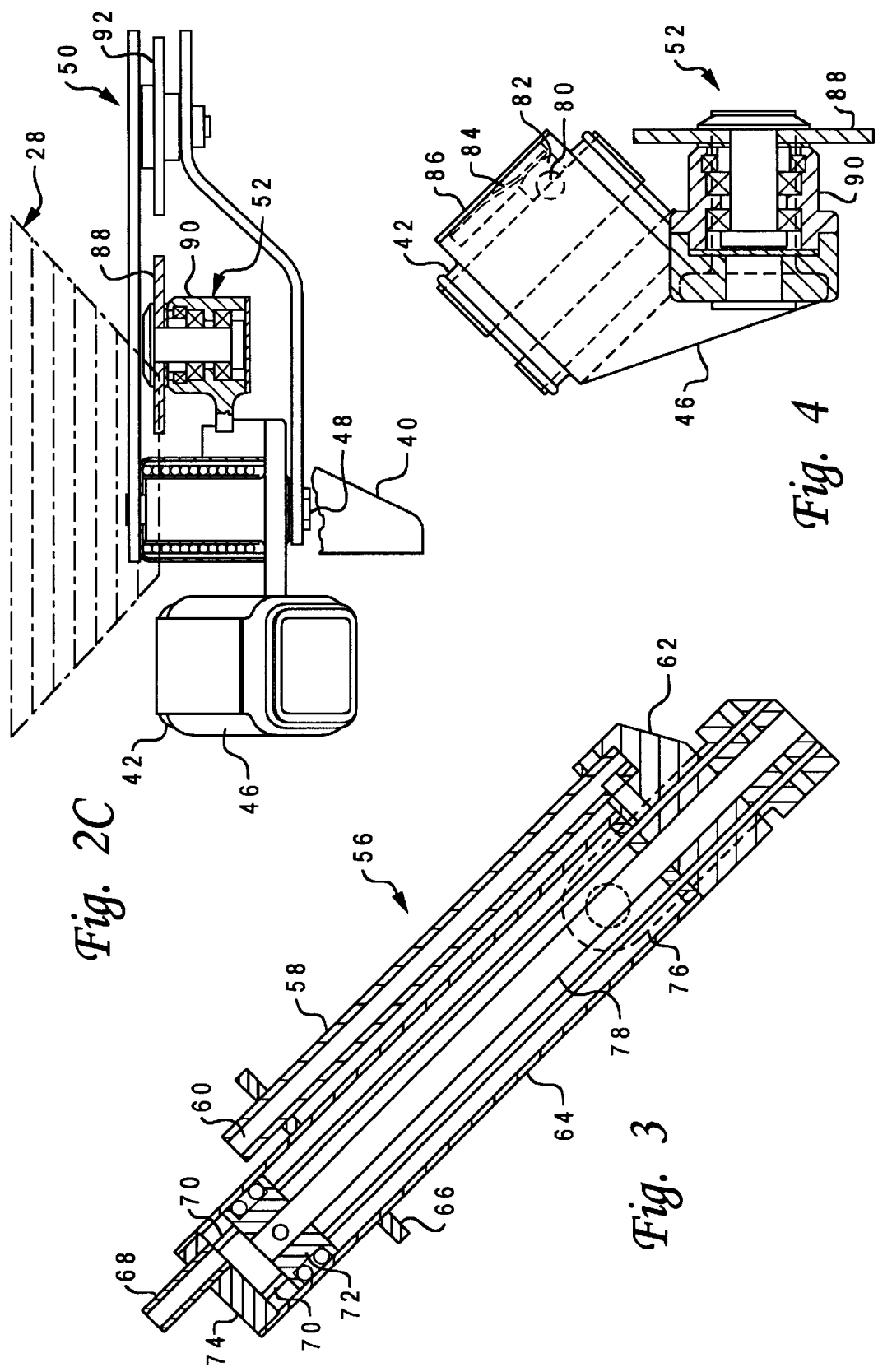

HYDRAULICALLY-OPERATED BICYCLE SHIFTING SYSTEM WITH POSITIVE PRESSURE ACTUATION

BACKGROUND OF THE INVENTION

1. Field of the Invention

The present invention generally relates to bicycles, and more particularly to hydraulically-operated control systems for bicycles.

2. Description of Related Art

Bicycles are equipped with multiple gears by operating a drive chain between a cluster of larger diameter sprockets on the pedal crankshaft and a sprocket cassette mounted on the rear wheel axle. A device known as a derailleur is used to position the drive chain on a given sprocket. Existing mechanical derailleur shifting systems usually incorporate four-bar linkage mechanisms that are controlled by tension cables. A rear derailleur is located on the lower slack side of the drive chain at the rear wheel, and a front derailleur is located on the upper tight side of the chain at the sprocket cluster attached to the pedal crankshaft. The shifting control mechanism for mechanical derailleurs can be mounted on the front down tube of the bicycle frame, but most commonly is mounted on the bicycle handle bars. The shifting control mechanism typically has a small diameter detented or ratcheted pulley around which the derailleur control cable is wrapped. Each derailleur is controlled by its own shifting control mechanism.

So-called "mountain" bicycles (designed for off-road use) have become increasingly popular over the past several years, and cyclists are riding these bikes in more harsh environments. Many new innovations have been incorporated into these bicycles to increase their comfort, control, and durability. Elastomeric, air, and hydraulic suspension systems have been added to both the front and rear of mountain bicycles. New hydraulic wheel and disc braking systems have also been introduced. Unfortunately, the front and rear chain shifting systems have remained essentially unchanged, and still use mechanical cables to control the chain guiding mechanisms.

These derailleurs provide satisfactory performance in relatively clean and dry operating environments like those experienced by road bicycles. However, when mountain bikes are used in the dusty, wet, and muddy conditions found on rugged and primitive roads and trails, various contaminants work their way into the derailleur's pivots and open linkages as well as into and under tension control cables. Such contamination makes the derailleurs difficult to shift, adversely affects their precision in shifting, and also makes them wear out very quickly. The cyclist is thus required to clean, lubricate, adjust and replace mountain bike derailleur components much more frequently. Under extremely harsh operating conditions, existing mechanical derailleurs will fail, making it impossible for the cyclist to change drive ratios.

Products are available which attempt to protect the current design of derailleurs from harsh mountain biking environments. Rubber covers or boots provide some protection for the parallel linkages on the front and rear derailleur mechanisms, but these covers are not waterproof, and mud and water can still enter the mechanisms. New styles of specially coated derailleur control cables are also being offered which are designed to be less affected by mud, water, and dirt. However, dirt can still enter these control cables and cause the cables to stick or bind inside their flexible guide housings.

Alternative derailleur designs exist which do not require tension cables, such as the hydraulically-actuated, manually-controlled shift system described in U.S. Pat. No. 3,742,777. In that design, conventional derailleurs are positioned using sealed actuating bellows which extend within the front or rear derailleur under the influence of hydraulic pressure generated within similar control bellows located in handle bar controller units. While this design avoids the problems associated with contamination of tension cables and related components, it presents several other problems. The first problem relates to the limited amount of force that can be applied with this design. When a partial internal vacuum is generated within the actuating bellows by movement of the control handle to pull open the control bellows, this partial vacuum causes external atmospheric pressure to exert a force on the end face of the control bellows. However, the partial vacuum also acts upon the soft side walls of the bellows, tending to cave them inward. This effect reduces the vacuum, so the actuating bellows does not reproduce the same unit of motion as was input by the cyclist at the control bellows, especially considering that the bellows must overcome the preload within the locating detents of the guide, as well as derailleur mechanism frictional forces, and the force required to push the chain from one sprocket to the adjacent sprocket. These combined axial forces can be in excess of 20 to 30 pounds.

By using a bellows with soft enough side walls to easily collapse under atmospheric pressure, the side walls would also tend to bulge outward when the bellows were pressurized, making it more difficult for the bellows to generate displacements that were directly proportional to the motion of the input bellows in the cyclist control units.

The flexible actuating bellows could be replaced with rigid side-wall bellows to prevent side-wall cave in. If this were done, however, the external pressure required to compress the bellows would likely exceed that available from atmospheric pressure, especially when the bellows is nearly fully compressed. Furthermore, such a system could no longer be totally sealed due to inherent leakage around the rod end seals of the cylinders.

Another shortcoming in the sealed bellows system is that it has no way of compensating for the expansion and contraction of hydraulic fluid. Bicycles today are being operated in more harsh conditions and wider temperature extremes than in the past, and the expansion and contraction of a fixed amount of hydraulic fluid within a sealed bellows system would be significant. The change in volume could result in the actuating bellows being at a different length than the control bellows, which could alter the range and locations of the shifting positions in the derailleurs with respect to the control devices.

Still another concern regarding the '777 system is cavitation of the hydraulic fluid when placed in a vacuum mode. Hydraulic fluids are traditionally designed to be used in a bulk compressive mode, and not to transfer force or motion in a vacuum mode. When some hydraulic fluids are placed in a vacuum, they bubble or cavitate, again reducing the level of vacuum in the system which would also reduce any pulling effect generated by the actuating bellows. While a bellows system could be constructed to maintain a sufficient vacuum, the actuation and control units would be excessively large in light of the cyclists' demands for minimum space and minimum weight.

It would, therefore, be desirable to devise an improved hydraulic shifting system which avoids the problems associated with mechanical derailleur control devices, and further provides precise and simple control in a compact design. It would be further advantageous if the improved hydraulic shifting system could be easily adapted to automatic shift control, and used in combination with other hydraulic systems, such as brakes.

SUMMARY OF THE INVENTION

It is therefore one object of the present invention to provide an improved hydraulic shifting system for bicycles.

It is another object of the present invention to provide such a hydraulic shifting system that requires reduced shifting forces but maintains uniform shifting control.

It is yet another object of the present invention to provide such a hydraulic shifting system in a compact design.

It is still another object of the present invention to provide an improved hydraulic shifting system for a bicycle which can be implemented with either manual control or automatic control, and which can further derive synergistic benefits from being used in combination with another hydraulic bicycle system.

The foregoing objects are achieved in a family of new bicycle shifting systems which incorporate the proven durability of shiftable chain and multi-sprocket drives, but utilize improved derailleur designs that are actuated and controlled by sealed hydraulic actuators. The improved bicycle shifting systems described herein include (i) a hydraulically-actuated, manually-powered front and rear derailleur shifting system, (ii) a hydraulically-actuated, power-assisted front and rear derailleur shifting system with manual control, and (iii) a hydraulically-actuated, power-assisted front and rear derailleur shifting system in which the shifting sequence for the rear derailleur is controlled automatically by pedal speed. Each of these shifting systems utilize a totally sealed, inclined linear shifting path. Combination hydraulic braking and shifting systems are also described that utilize handle bar mounted control devices with shifting and braking controls integrated into the same unit, and sharing common controller components including the housing, handle bar clamp, reservoir, etc. Various cyclist-operated shifting controls (single- or multiple-location) can be used with these systems.

According to one embodiment of the present invention, the hydraulically-actuated, manually-powered shifting system uses inclined, linear slide derailleurs having compact sealing boots. The control devices each contain UP and DOWN shift control levers that are moved by the cyclist to initiate the shifting process. When the cyclist operates one of the shift levers for either the front or rear derailleur, the control unit directs a fixed volume of pressurized hydraulic fluid through one of the pair of hydraulic lines to a small-bore hydraulic cylinder built into the derailleur. The inward or outward pushing force generated by the rod of the cylinder causes the derailleur to move toward or away from the bicycle, and in turn causes the drive chain to transfer to an adjacent sprocket or sprockets. The force required to move the derailleur is generated by the cyclist's finger or thumb moving the desired handle bar mounted control lever.

This embodiment exhibits increased ruggedness and durability, and requires reduced maintenance. Mud, dirt, grit, and water are prevented from entering any of the critical derailleur or control elements. The linear, inclined shifting path provides precise chain shifting, more uniform chain wrap on the rear bicycle drive sprockets, and lower chain and sprocket wear. A higher and more uniform chain slack tension is imparted to the chain from an improved idler arm to eliminate the need for aftermarket "chain slap elimination" devices. Significantly reduced shifting forces are required of the cyclist as a direct result of elimination of large return springs in derailleurs and also from elimination of high friction forces developed within mechanical tension cables used in mechanical derailleurs. There is no need to adjust shifting points in derailleurs after installation. A end-of-stroke flow-bypass feature may be built into the actuation cylinders to facilitate easy system priming, and to prevent end-of-stroke pressure overloads. Hydraulic shuttle valves allow the cyclist to have multiple control units for the same derailleur mounted at several convenient locations on the handle bars. Different control units can be provided to move derailleurs in single shift increments (one sprocket to an adjacent sprocket), or to move the derailleurs through multiple shift increments with one operation of the shift lever.

Another embodiment of the present invention utilizes the same hydraulically-actuated front and rear derailleurs as the previous system, but contains additional components to provide power-assisted shifting. An integral hydraulic pump in the rear derailleur is driven by the motion of the chain, and provides high pressure hydraulic fluid for power-assisted operation of hydraulic cylinders in the front and rear derailleurs. To control the flow of fluid provided by the pump, a dual spool control valve and reservoir assembly are integrated into the rear derailleur. The handle bar mounted controls for this shifting system are designed to control the operation of the spool valves in the rear derailleur rather than powering the actuating cylinders in the derailleurs directly.

The power-assisted shifting system possesses all of the advantages described for the previous system, since it utilizes the same hydraulically-actuated derailleurs, and has several additional advantages. Input shifting forces that must be exerted by the cyclist's fingers are significantly lower than for the previous unpowered system. The cyclist must overcome only the force of several light return springs in the control unit and derailleur spool control valves to initiate a shifting sequence. The power-assisted shifting system will continue to shift in either direction to the end of its shifting range as long as the cyclist holds the shifting control device in its actuated position. Flow-bypass features built into the actuating cylinders prevent any derailleur damage to the hydraulic pumping or mechanical components. The chain also only shifts when the pedals are being rotated by the cyclist, eliminating high-side loading generated in the derailleur mechanism from the derailleur being move laterally when the chain cannot transfer to adjacent sprockets. Two different cyclist controller options are disclosed for use with this embodiment. A dual lever controller allows thumb or finger operation. Cyclists preferring a twist grip method of shifting may use an alternative design in which a short grip ring adjacent the brake lever is rotated clockwise for shifting in one direction and counter-clockwise for shifting in the other direction. Unlike the manually-controlled system, the power-assisted system requires only one hydraulic line connection from the cyclist input control unit on each handle bar to the rear derailleur (the previous system requires two lines per handle bar control valve).

According to a third embodiment of the present invention, the same front and rear derailleurs are used as in the previous power-assisted system but, in place of the cyclist-operated shifting controller for the rear derailleur, the third system has an adjustable servo control valve that senses pedaling speed, and controls the operation of the spool control valve to automatically select the optimum ratio for the cyclist. The speed-sensitive servo responds to the flow rate of hydraulic fluid from the power-assist pump that is integral with the rear derailleur. The output of the pump is proportional to the pedaling speed of the bicycle. The automatic shifting servo sends control signals to the rear derailleur control valve to cause the derailleur to shift up or down. If the servo valve determines that the pedaling speed has fallen below a lower limit set by the cyclist, then it signals the rear derailleur control valve to shift to a higher ratio chain combination. Conversely, if the servo determines that the pedaling speed has exceeded an upper limit set by the cyclist, then it sends a signal to the rear derailleur control valve to shift to a lower ratio chain sprocket combination. In between the two limits, the system does not shift.

The automatic power-assisted hydraulic system possesses most of the features and advantages of the previous systems. In addition, it provides the automatic shifting feature for all bicycles having existing derailleur-style shifting systems.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 2A is a side elevational view of a rear derailleur assembly used with the shifting system of FIG. 1, while FIG. 2B is a front elevational view of the same assembly, and FIG. 2C is a top plan view of the assembly;

FIG. 3 is a front elevational view of a hydraulic actuator cylinder used with the assembly of FIGS. 2A–2C;

FIG. 4 is a front elevational view of a detent mechanism which can be used with the assembly of FIGS. 2A–2C;

FIG. 10A is a side elevational view and partial cross-section of another shifting control unit constructed in accordance with the present invention, which may also be used with the power-assisted shifting system of FIG. 7, while FIG. 11A is a sectional view of one embodiment of a servo control valve which can be used in accordance with the present invention to provide automatic shifting, while

DESCRIPTION OF AN ILLUSTRATIVE EMBODIMENT

Figure 1:
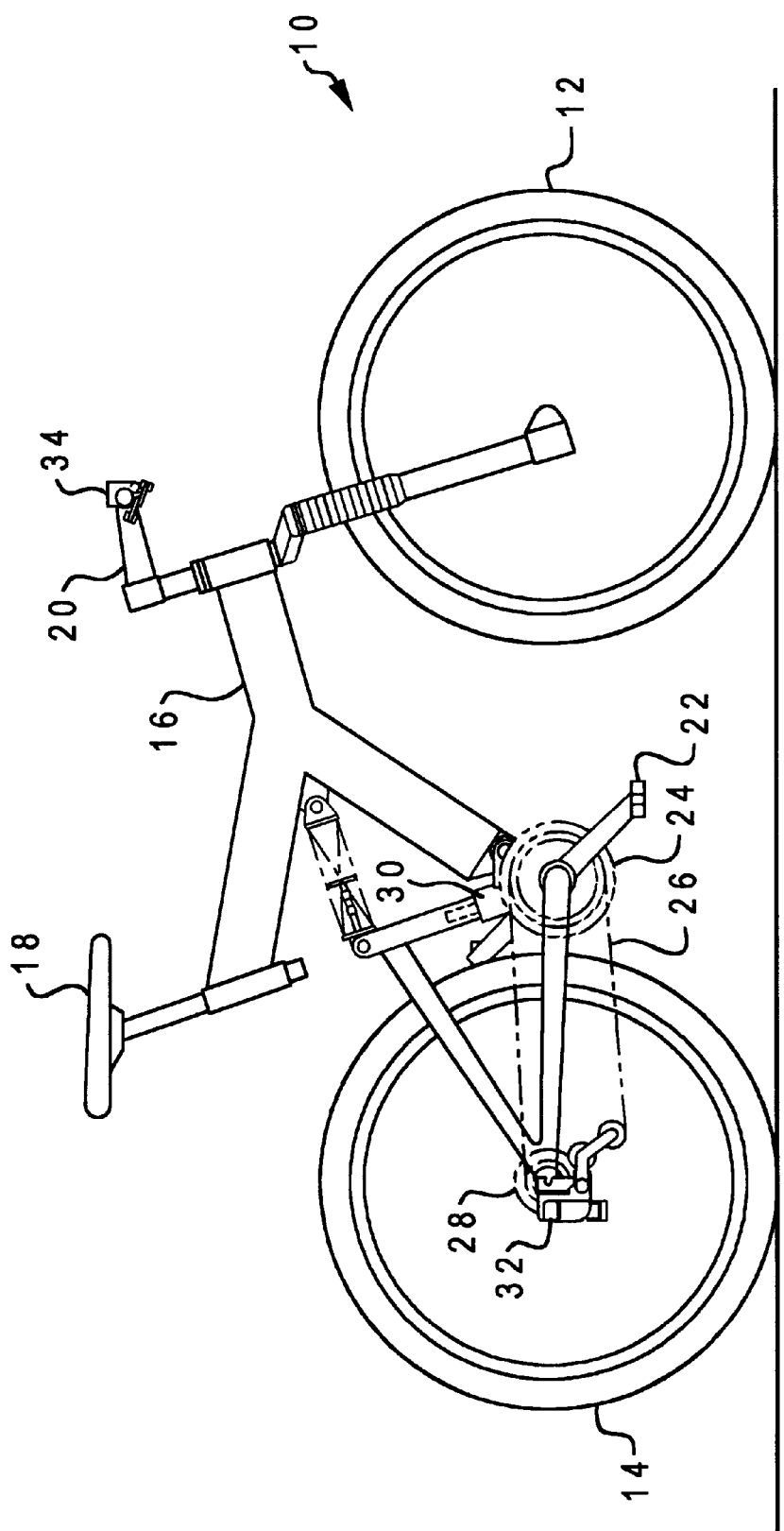
FIG. 1 is a side elevational view of one embodiment of a bicycle having a hydraulically-actuated derailleur shifting system constructed in accordance with the present invention.

With reference now to the figures, and in particular with reference to FIG. 1, there is depicted one embodiment 10 of a bicycle constructed in accordance with the present invention, having a hydraulically-actuated derailleur shifting system. Bicycle 10 has several conventional elements, including front and rear wheels 12 and 14, frame 16, seat 18, handlebars 20, and pedals 22. Pedals 22 are fastened to a pedal crankshaft which in turn is affixed to a cluster 24 of larger diameter sprockets. A drive chain 26 extends between sprocket cluster 24 and a sprocket cassette 28 mounted on the axle of rear wheel 14. Rear wheel sprocket cassette 28 may have a set of, e.g., from five to nine sprockets of slightly different diameters that are mounted to the rear wheel around a ratcheted hub. These sprockets are arranged by size with the smallest being furthest away from the hub and the largest closest to the hub. Two or three larger diameter sprockets may be provided for front wheel sprocket cluster 24. The sprockets in the front cluster are similarly arranged with the largest sprocket being furthest away from the bicycle frame, and the smallest sprocket being closest to the frame.

In the embodiment of FIG. 1, the shifting system is more specifically a hydraulically-actuated, manually-powered (HAMP) shifting system comprised of separate hydraulically-operated front and rear derailleur mechanisms 30 and 32, respectively, along with hydraulic, handle bar mounted, manual control units 34. Front and rear derailleurs 30 and 32 may be mounted on bicycle 10 in the same general location as existing mechanical derailleurs. As described further below, each derailleur utilizes a totally sealed, linear slide mechanism for moving and positioning chain 26 along an inclined, straight chain shifting path with respect to the front and rear sprocket sets.

Referring now to FIGS. 2A, 2B and 2C, a main mounting bracket 40 is fastened to a derailleur mounting drop at the rear portion of frame 16. Mounting bracket 40 could also be secured to a bicycle at an open-sided, slotted hole for a rear wheel axle skewer. If the rear wheel skewer and wheel were removed for a tire change or maintenance, the screw through the lower hole in main mounting bracket 40 would not be removed during wheel changes. A linear slide tube 42 is attached to bracket 40, and is inclined downward at an angle of approximately 45° with respect to the rear axle of the mountain bike (FIG. 2B); for cassettes mounted on a road bike, the derailleur inclination would be less. Slide tube 42 extends parallel to the axle when viewed from the top (FIG. 2C). A 90° angle bracket 44 permanently affixed to the top end of slide tube 42, is adjustably attached to main mounting bracket 40 by four screws passing through slotted holes in main bracket 40 and into tapped holes in 90° angle bracket 44. The face of 90° bracket 44 which is parallel to tube 42 fits into a shallow slot on the face of main bracket 40 and is guided for movement at a 45° angle to the rear wheel axle. This mounting system enables the installer to accurately adjust the location of derailleur positioning detents with respect to rear sprocket cassette 28.

Linear slide tube 42 provides four smooth-precision, guiding surfaces for a linear slide block and bushing assembly 46 to slide upon. A thin, rectangular cross-section bearing formed of a polymer having a low friction coefficient is fitted against the inside surface of rectangular slide block 46 to decrease the frictional forces between slide block 46 and the outside of slide tube 42. The clearance between the plastic bearing and the outside of the slide tube is preferably about 0.001" per side. Slide block 46 does not rotate with respect to the centerline of slide tube 42. Linear slide block 46 also includes a forwardly projecting bracket or plate on its lower side having three mounting holes. One hole is provided for mounting a pivot shaft 48 of a dual-pivot, chain idler arm assembly 50, and two holes are provided for mounting a chain guide sprocket and bearing block assembly 52.

Both ends of linear slide block 46 contain circumferential mounting channels and retention ribs for attaching and sealing one end, respectively, of a pair of upper and lower sealing boots (not shown). The sealing boots are flexible, corrugated, and rectangular in cross-section. The other ends of these boots are attached, respectively, to similar mounting surfaces adjacent 90° mounting bracket 44 at the upper end of the tube, and part of a plastic cap 54 that covers the lower end of the slide tube respectively. A clamping strap (also not shown) may be provided at both ends of each boot to press them firmly into the circumferential grooves, and to prevent the boots from sliding over the circumferential retention ribs. Clamping straps improve the seal at the end of each boot and prevent entry of moisture or dirt under the boot. Sealant, mastic or adhesive material might also be used between block 46, cap 54, and slide tube 42 to further improve the seals. As block 46 moves up and down slide tube 42, the upper and lower boots become longer and shorter respectively, but maintain sealed contact with linear slide block 46 and the upper and lower ends of slide tube 42, preventing water, dirt, dust, mud, or other contaminants from coming into contact with the precision sliding surfaces between slide tube 42 and block 46.

Linear slide tube 42 houses a rear derailleur hydraulic power cylinder 56 with a 0.440" diameter bore, which can be seen in FIG. 2B, and is further shown in FIG. 3. The head end of cylinder 56 extends inside slide tube 42 for approximately its full length. The tail end of cylinder 56 extends out of the upper end of slide tube 42, through and slightly beyond the outside surface of 90° mounting bracket 44. Hydraulic power cylinder 56 also contains a small diameter metallic tube or line 58 running parallel to the bore, from tail end to head end. Tube 58 conducts hydraulic fluid from a hydraulic connection location 60 adjacent the tail end of cylinder 56 (which is exposed at the top of the slide tube assembly) to the head end of the cylinder (which is otherwise inaccessible inside the slide tube). The head end of cylinder 56 has an end block 62 with a passageway having a 90° angle for changing the direction of flow from tube 58 into the head end of cylinder 56. The head end of cylinder 56 and longitudinal hydraulic tube 58 may be brazed, or mechanically sealed or bonded to one another.

Both the outer tube 64 of cylinder 56 and hydraulic line 58 pass through and are brazed or bonded to a flat mounting plate 66 located near the tail end of the cylinder. Plate 66 (and a plate sealing gasket) are fastened to the top of 90° slide tube bracket 44, securing cylinder 56 to slide tube assembly 42, and preventing moisture from entering around the cylinder or hydraulic line and contaminating the derailleur sliding surfaces. The exposed end of hydraulic line 58 is equipped with a fitting (not shown) for hydraulic connection to a control valve assembly or handle bar mounted control unit, described further below. A port 68 and hydraulic fitting are also provided at the tail end of cylinder 56 for connection to the control valve assembly.

The inside bore of hydraulic cylinder 56 adjacent the head end and tail end cap blocks contains several shallow grooves 70 running parallel to the axis of the cylinder from the end caps, for approximately 0.20" toward the center of the cylinder tube. Each groove is approximately 0.06" wide and 0.01" deep, having smooth beveled edges to prevent cutting or damaging the seal on the cylinder's piston 72. When the side face of piston 72 is in contact with the tail end cap 74 of cylinder 56, the O-ring piston seal lies slightly beyond the inward end of these grooves 70. This position interrupts the circumferential seal generated between the piston O-ring and the inside bore of cylinder 56, and provides a path for air and or hydraulic fluid to pass by piston 72 during cylinder bleeding or achievement of end-of-stroke limits.

The rod 78 of power cylinder 56 is secured by a pin or a thread to a U-shaped clevis 76. When mounted to cylinder rod 78, the legs of clevis 76 extend back up both sides of the outside of cylinder 56 toward the top end of slide tube 42. These legs each contain a tapped mounting hole to accept shoulder screws that attach slide block 46 to clevis 76 through longitudinal clearance slots in opposite vertical faces of linear slide tube 42.

When power cylinder 56 is pressurized from either end by hydraulic fluid, the force exerted against piston 72 is transferred through cylinder rod 78 to clevis 76, and through the two shoulder attachment screws to slide block 46, causing block 46 to move upward or downward along slide tube 42. The motion of slide block 46 on its guide tube 42 results in movement of chain idler arm assembly 50, which further moves the slack side of chain 26 along its shifting path, and causes it to be transferred between adjacent sprockets on rear cassette 28. Accurate positioning of slide block 46 may be accomplished through the use of a positive detent mechanism incorporated into the top portion of slide block 46.

One satisfactory detent mechanism, shown in FIG. 4, may take the form of hardened detent balls or a roller 80 supported by, and fitting into, a half-cylindrical (or spherical) groove(s) in a low friction polymeric block 82. Polymeric block 82 is accurately fitted into a slot on the top surface of slide block 46, and can slide into or out of this slot. Roller guide block 82 is backed up by a leaf spring 84 to push detent roller 80 toward the center of slide block 46. Leaf spring 84 is preferably provided with a compression adjustment screw (not shown) to enable adjustment of the preload on detent roller 80. The cavity in slide block 46 containing detent roller 80, guide block 82, and leaf spring 84 may be protected from dirt and moisture by a gasketed cover plate 86. Detent roller 80 engages one of a number of equally-spaced, tapered longitudinal depressions or partially-through slots (narrower at the base than the detent roller diameter) located in the outer surface of slide tube 42. The number and location of these depressions correspond to the sprockets on rear cassette 28. These depressions or slots are slightly longer than the length of roller 80, and have angled or chamfered side walls. The angle of the side walls determines in part the centering force that detent roller 80 can impart on slide block 46 as it is being pushed into the slot by leaf spring 84 through plastic guide block 82. The steeper the side walls, the greater the centering force imparted to slide block 46 by leaf spring 84. However, steeper side walls also require greater force by power cylinder 56 to overcome the detent resistance and move block 46 to its next position. The depression spacing, side-wall angle, and preload on the leaf spring are preferably selected to provide maximum positioning capability for slide block 46, and minimum cylinder force to move block 46 between detent positions.

A chain guide sprocket 88 in sprocket and bearing block assembly 52 is responsible for transferring the slack side of drive chain 26 between sprockets on the underside of rear sprocket cassette 28 during shifting. As the rear derailleur (block 46) moves along its inclined straight line path under rear cassette 28, it also moves chain guide sprocket 88 along this path. As chain guide sprocket 88 moves with respect to cassette 28, it pushes chain 26 perpendicular to its normal path, causing it to disengage from one sprocket and to "climb" up or down the side face of an adjacent sprocket until it fully engages the new sprocket. The slack length of the chain changes, and chain idler mechanism 50 compensates for the additional or reduced slack by rotating about its pivot, as shown in FIG. 2A. Chain guide sprocket 88 may be mounted on a rotating shaft containing bearings in a bearing block, or on a non-rotating shaft with a bearing between the guide sprocket and the shaft. The rotating or non-rotating support shaft for chain guide sprocket 52 is supported in a block 90 attached to an end of the forward extending bracket on linear slide block 46. The same hole-mounting pattern can be used to interchangeably mount a small hydraulic pump for power-assisted shifting as described further below.

Idler arm assembly 50 is spring-loaded with a very long length helical torsion spring (not shown) having a much more uniform torsional spring rate than springs used in existing mechanical derailleurs. The ends of the torsion spring are connected between the forward extension from main derailleur slider block 46 and one of the two outside plates of arm assembly 50, tending to pull the idler sprocket 92 toward the rear of bicycle 10. The torsion spring can be sealed in a cup with O-rings and grease to prevent corrosion.

A second hydraulic power cylinder may be similarly provided on the front chain guide to position chain 26 on one of the sprockets of front wheel sprocket cluster 24. The shifting path for the front derailleur would be directly above the front sprocket cluster 24 on the pedal crankshaft, and inclined at an angle of approximately 30° with respect to the pedal crankshaft when viewed from the front of the bicycle.

The hydraulic pressure necessary to move the front and rear derailleurs between shifting positions may be provided by small lever-operated pumping devices contained within front and rear derailleur control units mounted on the right and left sides of handle bars 20, respectively, preferably adjacent the bicycle's brake levers and near the end grips on the handle bars. Two hydraulic fluid pumping devices would be incorporated into each controller unit, to provide pressure or a pushing force on each end of the actuation cylinders 56. Two small-diameter hydraulic lines connect each control unit to its derailleur. These hydraulic lines may easily be routed along or within bicycle frame 16 and around suspension pivot points. Each control unit would also contain an integral reservoir and simple pressure relief valves to prevent excessive side loading on the derailleur when shifting is attempted and the chain is not moving.

Figure 5:
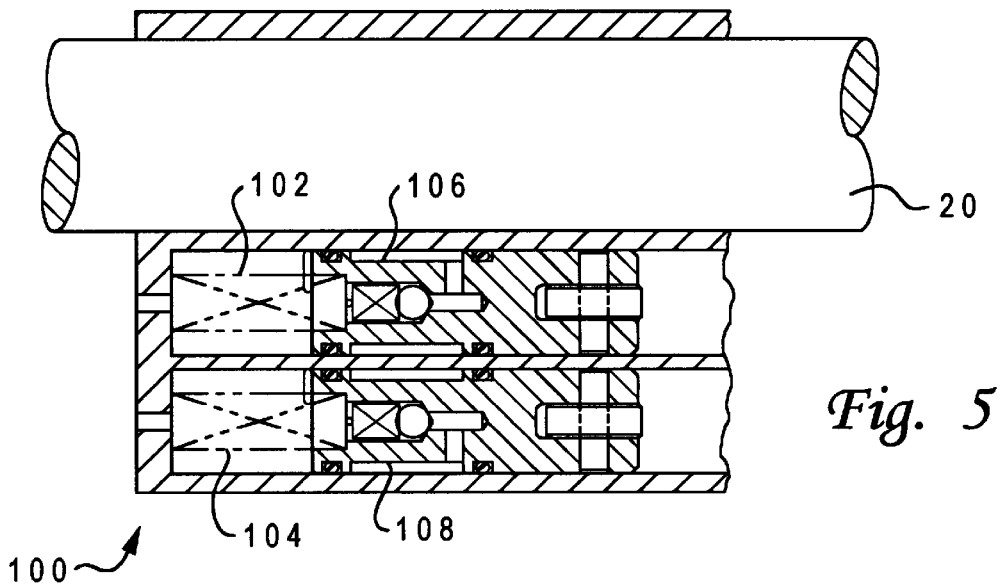
FIG. 5 is a sectional view of a manually-powered shifting control unit constructed in accordance with the present invention, and usable with the assembly of FIGS. 2A–2C.

FIG. 5 illustrates one embodiment 100 of a control device that includes two different diameter axial piston pumps 102 and 104. Pump 102 is in fluid communication with the tail end of an actuating cylinder 56, while pump 104 is in fluid communication with the head end of the same cylinder. The pistons 106 and 108 in these pumps are connected by cam rollers to operating levers (not shown) that are pushed by the cyclist's thumb or index finger. The thumb lever causes piston 106 in pump 102 to move in its bore, and displace a given derailleur mechanism toward the particular bicycle wheel (toward the larger diameter sprockets). The index finger lever causes piston 108 in pump 104 to move in its bore, and thereby displace the derailleur mechanism away from the bicycle wheel (toward smaller diameter sprockets). Ball check valves built into each piston allow them to spring back to their original positions when the cyclist releases the control levers, without drawing back piston 72 in the actuating cylinder.

Pumps 102 and 104 have vent ports located slightly ahead of the end faces of the pistons, which communicate with the reservoirs. In the normal spring-returned position of the pistons, the vent ports are uncovered or open. When a piston starts to move in its bore, the vent port is covered and the volume of fluid ahead of the piston is pumped through the hydraulic line and into the actuation cylinder. Fluid displaced out the opposite end of the actuation cylinder is returned back to the opposite pump through its hydraulic line, through its open vent port and back into its reservoir. A pressure bypass valve (spring preloaded ball) is connected between the discharge end of each pump and its reservoir. In the event a pumping piston 106 or 108 is actuated while chain 26 is not moving, excessive pressure and fluid flow is vented back to the reservoir without damaging the derailleur or hydraulic components.

The housing of control unit 100 is preferably mounted so that the top edge of the reservoir is approximately horizontal when the bicycle is on a flat surface. In this position, the DOWN and UP shift control levers most preferably lie in a plane which is inclined approximately 20° from the horizontal, with the DOWN lever being slightly higher than the UP lever. This orientation provides the cyclist with the greatest comfort and control when shifting the DOWN lever with the thumb, or when shifting the UP lever with the index finger.

If a derailleur were at either of its end limits and the cyclist attempted to continue to shift in the direction of the end limit, slider block 46 would begin to move, and the detent roller would be forced slightly out of its centering notch. This slight movement then allows piston 72 to move close to the tail or head ends of cylinder 56 and uncover the bypass ports at the ends of the cylinder bore. Pressure and fluid would be safely bypassed around the piston, thereby preventing any damage to the HAMP system and derailleur.

It is possible to increase the stroke length of the lever-operated shifting control units 100, and/or the diameter of the pumping cylinders, to enable the cyclist to shift through two or more gear ratios with a single lever motion, i.e, during a single shifting sequence. With such an arrangement, the controller lever could have intermediate detent positions between the stops on the lever, providing an indication of the number of individual shifting increments that had been traversed by the derailleur in the shifting process.

Figure 6:
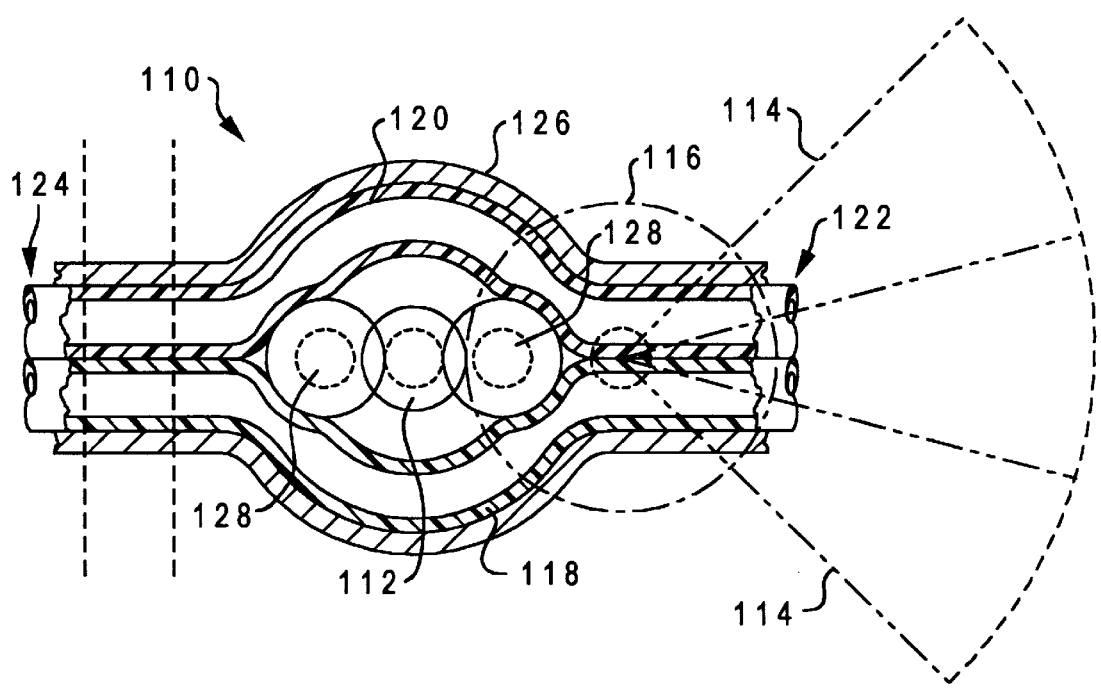
FIG. 6 is a sectional view of another manually-powered shifting control unit constructed in accordance with the present invention, also usable with the assembly of FIGS. 2A–2C.

Other pumping systems may be used for shifting control units. One alternative design 110 is illustrated in FIG. 6. Control unit 110 incorporates a double-sided peristaltic pump that is driven by a dual roller pumping rotor 112. In an exemplary implementation, rotor 112 is rotated 180° per cycle through a 3-to-1 gear drive system, by two ratcheted levers 114 which operate in opposing directions on the pivot shaft of a larger drive gear 116; in other words, moving either lever 60° causes rotor 112 to move 180°. Rotation of rotor 112 displaces pressurized hydraulic fluid into one of the two ends of the actuator cylinder, according to the direction of rotation. Each operating lever 114 is spring-returned against a stop, and each has a spring-loaded drive pawl that engages the teeth of gear 116 when the lever is moved. As in the previous system 100, one of the two levers 114 is conveniently operated by the cyclist's thumb, while the other level is operated by the index finger. When levers 114 are in their normal spring-returned positions, the pawls are lifted out of contact with the gear teeth. When moved, a lever raises its pawl off a lift cam and into contact with gear 116, driving gear 16 clockwise or counter-clockwise, depending upon which lever was actuated.

The pumping chamber within controller 110 contains two lengths 118 and 120 of preformed flexible tubing, having slightly differing inside diameters. These inside diameters are selected to provide the two different fluid volumes that are required to displace piston 72 in actuator cylinder 56 the same distance in each direction for a 180° rotation of pumping rotor 112 (one shift length increment in the derailleur). One end 122 of a given tubing segment is connected to a reservoir, and the other end 124 is connected to a small diameter hydraulic line running to the head or tail end of the actuating cylinder. The shaped tubing segments 118 and 120 are backed up on the outside of the chamber by curved rails 126. As pumping rotor 112 rotates within the pumping chamber, the rollers 128 compress flexible pumping tubing 118 and 120, displacing fluid in each of the tubes. Fluid in one tube is pumped to a hydraulic cylinder 56 under pressure to cause piston 72 in the cylinder to move. Hydraulic fluid in the other tube is pumped back to the reservoir, ahead of the fluid which is returning back to that pumping tube from the discharge end of the actuation cylinder. The normal resting position for pumping rotor 112 is that location where both rollers 128 are in contact with both flexible pumping tubes 118 and 120, and both tubes are only slightly collapsed but not sealed off by the rollers.

Each reservoir for control unit 110 is preferably fitted with a cap containing a small, flexible, air-filled bladder on its inside surface. With the reservoir filled to a prescribed level when the fluid was cold, the cap is screwed onto the top of the reservoir. The bladder begins to move down into the fluid and displace any air between the fluid and the outside of the bladder until the cap is sealed against the top of the reservoir. The bladder portion of the cap is then located inside the reservoir, with no air bubbles existing in the fluid. As the fluid warms and expands, the bladder collapses slightly to accommodate the fluid expansion. Even with the bladder expansion and contraction, no air bubbles are allowed to enter the fluid, and thus the hydraulic system. In the unlikely event that some air bubbles do get into the hydraulic system, these could easily be bled out by running the derailleur actuator cylinder against its one of its stops, and bypassing the air bubbles past the piston and back into the reservoir.

Figure 7:
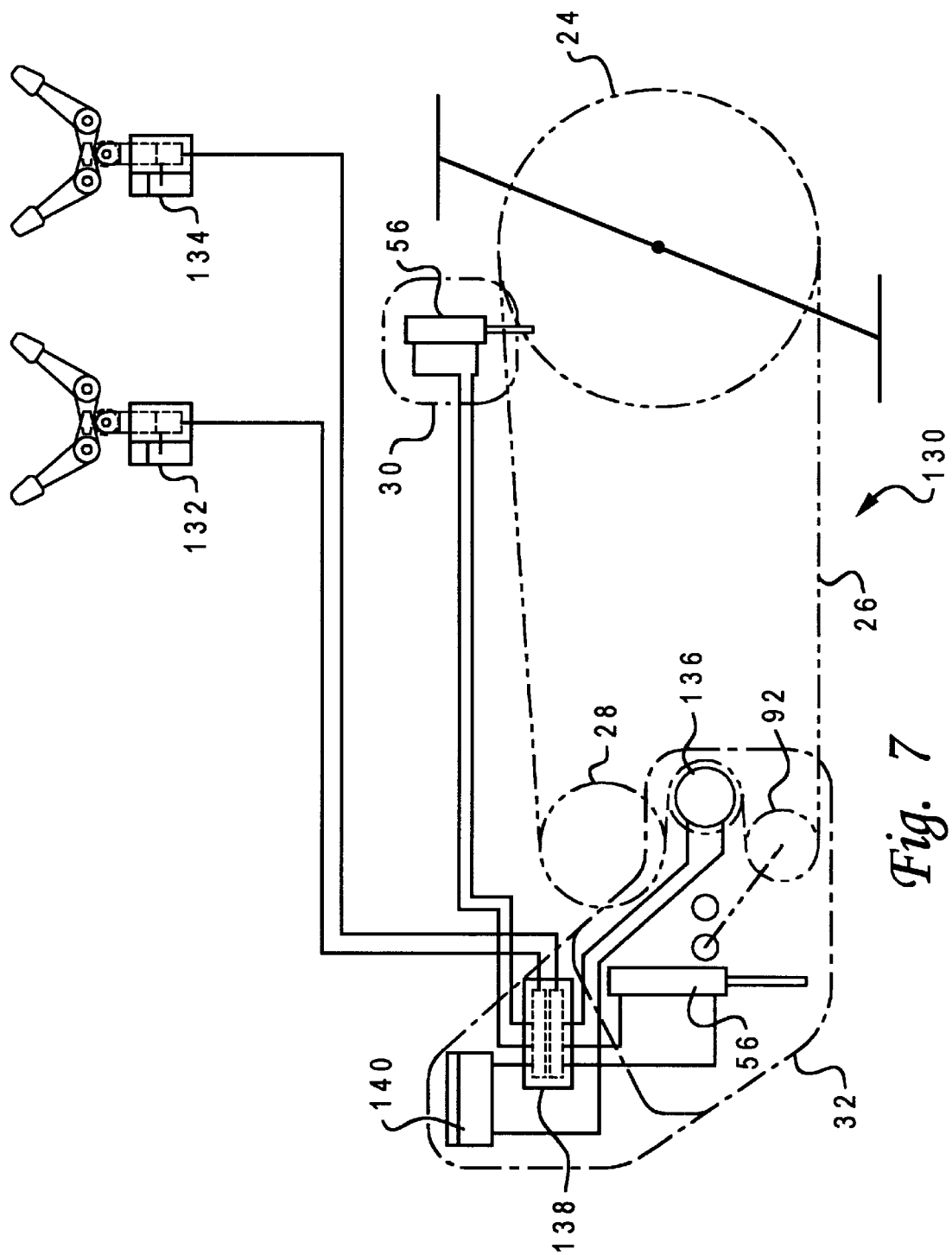
FIG. 7 is a schematic diagram of another hydraulically-actuated shifting system constructed in accordance with the present invention, which is similar to the system of FIG. 1, but further provides power-assisted shifting.
Figure 8:
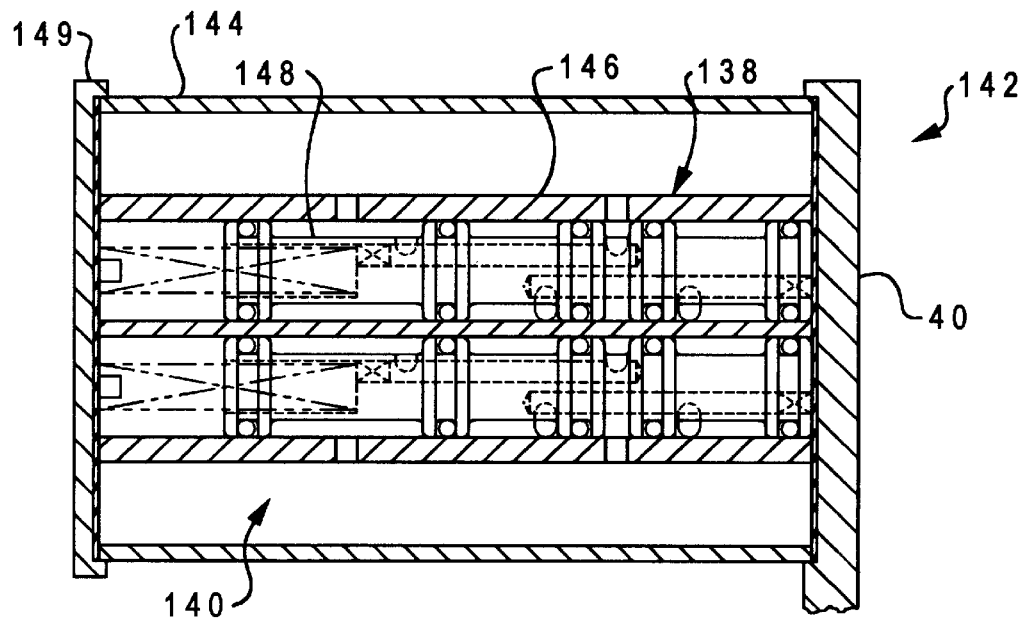
FIG. 8 is a sectional view of a spool control valve and hydraulic fluid reservoir assembly used with the power-assisted shifting system of FIG. 7.

FIGS. 7 and 8 illustrate how the foregoing manually-powered system may be further modified to provide power-assisted derailleur shifting. A hydraulically-actuated, powered-assisted (HAPA) shifting system 130 includes the same separate front and rear derailleur mechanisms 30 and 32, but now has respective handle bar mounted, power-assist control units 132 and 134. Also provided are a chain-driven hydraulic pump 136, a dual spool control valve 138, and a pump reservoir 140, with appropriate hydraulic line connections as discussed below. Spool control valve assembly 138 and reservoir 140 may be attached to a modified mounting bracket similar to main mounting bracket 40. Pump 136 is integrated into the chain idler pulley.

Hydraulic pump 136 may include two metallic housing halves attached together with four fasteners, and having an O-Ring seal between the housing faces to prevent pressurized oil from escaping from the housing. A multi-lobed, "Gerotor" style internal gear and external ring pumping set (commercially available) are located in the housing. The Gerotor pumping set is large enough to provide slightly more volume per revolution than would be required to move one of the hydraulic power cylinders 56 by one shifting increment (approximately 0.22" along the shifting path). The chain guiding sprocket 88 is mounted to the larger end of the pump shaft and, as before, engages the slack side of bicycle chain 26 under rear sprocket cassette 28. Therefore, when the chain is moving, sprocket 88 drives pump 136. A shaft lip seal may be provided between the ball bearing and sprocket 88 to prevent oil in pump 136 from leaking out around the shaft, and to prevent water or dirt form entering the pump. A grease-filled felt or polymeric sealing washer, in conjunction with a labyrinth-style seal, can also be provided between the end face of the pump housing and the side of the sprocket to prevent dirt and water from entering the pump.

Inlet and exhaust pressure ports are drilled into the side wall of the housing, parallel to the pump shaft axis and adjacent the Gerotor pumping assembly. These ports communicate with cross-drilled ports (perpendicular to the pump shaft axis) that exit out the edge of the housing, facing rearward. Small barbed fittings are threaded into these inlet and outlet ports to receive small diameter flexible hydraulic tubing routed to hydraulic fluid reservoir 140 and spool control valve 138, respectively. As the pump shaft is rotated by the moving bicycle chain, oil is pumped from reservoir 140, through the Gerotor pumping assembly, and into spool control valve assembly 138. If both spools in assembly 138 are in their unactuated positions (no shifting), hydraulic fluid is pumped through valve assembly 138 and back to reservoir 140. The only resistance to drive chain 26 from pump 136 while in this mode is the bearing friction in the pump, and fluid friction in the hydraulic lines. The cyclist is therefore virtually unable to detect any resistance to pedaling when the chain is not being shifted.

As seen in FIG. 8, hydraulic spool control valve 138 and reservoir 140 may be combined into a single assembly 142. The reservoir is contained within a housing 144 of assembly 142. Valve 138 includes a valve body 146 also located within housing 144. Valve body 146 contains two identical spring-returned spool valves 148 that slide longitudinally in smooth, parallel through-bores in valve body 146. One spool valve operates the power cylinder in the front derailleur, and the other spool valve operates the power cylinder in the rear derailleur. The spool bores in valve body 146 are intersected at several points by cross-drilled holes which provide hydraulic fluid porting at selected locations along the length of the spool valves. Each spool valve has a number of O-ring seals captured in grooves along the spool length. Fluid passage grooves are also provided between the O-ring seal areas on the spools, to enable hydraulic fluid to flow around, into, and out of the spool in its bore. Small chamfers provided on the cross-drilled port holes prevent cutting into the O-rings as they pass over these ports.

Each spool valve contains a pocket for a return spring at one end, and further contains two longitudinally drilled holes (parallel to the spool center line). Cross-drilled holes intersect these longitudinal holes at several locations in the grooves of the spool, and provide for oil flow between grooves within the spool itself. Both ends of both longitudinal holes in each spool are plugged with steel balls so that oil can only flow from one passage groove to another inside the spool, and not out the ends of the spool. Spool valve body 146 has four blind tapped holes at each end. Reservoir housing 144 is approximately 0.003" longer than the length of valve body 146. The ends of valve body 146 and reservoir tube 144 are attached in a shallow circular recess to the side of main mounting bracket 40 on one end, and to a circular cap plate 148 with a similar circular recess at the other end. A circular gasket containing clearance holes for fasteners and valve porting is positioned in the recess in each plate/bracket, sealing the ends of tube 144 and valve body 146.

The cylindrical, thin-walled reservoir tube 144 has filler and drain ports located approximately at the lengthwise center of the tube, and oriented 180° apart. When assembled with the mounting bracket, the filler port faces up on the top side of the tube, and the drain port is on the under side of the tube.

The mounting bracket plate has two ports formed therein, which connect the end of each valve spool (opposite the return spring end) to shift control devices 132 and 134. The mounting bracket plate also contain ports for connection to the both ends of the front and rear derailleur power hydraulic cylinders. Cap plate 148 contains ports to connect the inlet port of hydraulic pump 136 to the bottom side of the reservoir, and to connect the pressure port of pump 136 to spool valve body 146.

A simple pressure-relief valve may be provided on the pressure port in valve body 146 where oil enters from pump 136, and before it enters the spool valves. This relief valve consists of a vent hole cross-drilled from the outside of the valve body into the inlet pressure port. This hole is drilled out with a larger diameter drill almost to the point where the smaller diameter hole intersects the pressure port. The larger end of the vent hole is threaded, and a conical seat is thus generated in the vent hole. A steel ball is pressed against this conical seat by a compression spring backed up by a hollow adjustment screw. In this manner, when the pressure in the inlet port of valve body 146 exceeds a predetermined level, the steel ball is lifted off its seat against the preload of the compression spring, allowing the excess pressure and flow from pump 136 to be vented around the steel ball, through the spring and hollow adjustment screw, and back into the reservoir.

Figure 9:
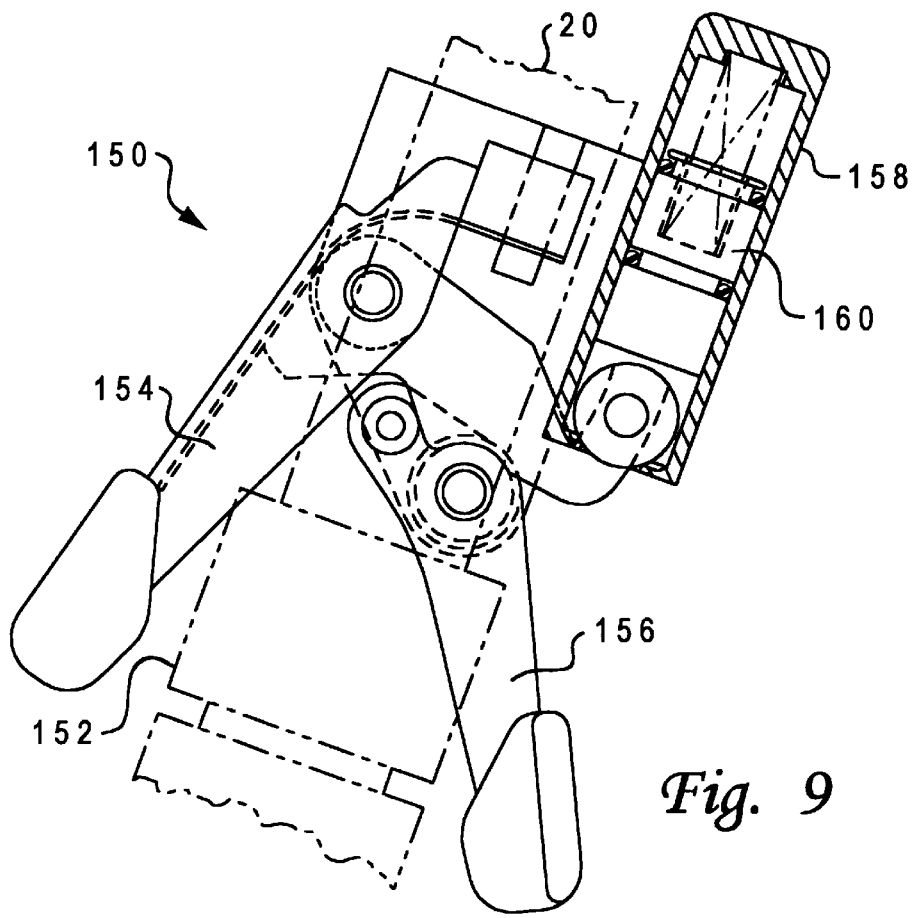
FIG. 9 is a top plan view and partial cross-section showing a shifting control unit constructed in accordance with the present invention, which may be used with the power-assisted shifting system of FIG. 7.

Two different cyclist input control options are again suggested for HAPA system 130. One control device uses levers to convert shifting signals from the cyclist into hydraulic pressure signals for the spool control valve. The other option is a "twist grip" input control device in which a grip ring located adjacent the brake levers is rotated to initiate shift sequences. FIG. 9 illustrates the first of these devices.

The lever shift control device 150 for HAPA system 130 includes a housing 152 mounted on the handle bars by means of an integral mounting clamp, along with DOWN and UP spring-returned control levers 154 and 156 which are operated by the cyclist's thumb and forefinger. Housing 152 also contains a pump cylinder 158 and a spring-returned hydraulic pump piston 160 actuated by both the DOWN and UP shifting levers. Moving the DOWN shifting control lever 154 to its stop position and then releasing it, while the cyclist is pedaling and the chain is moving, causes the rear derailleur to transfer the chain toward the rear wheel and in the direction of larger diameter sprockets in the cassette. Moving the UP shifting control lever 156 to its stop position and then releasing it, causes the rear derailleur to transfer the chain away from the rear wheel and in the direction of smaller diameter sprockets in the rear cassette. Moving either lever to its stop position while the cyclist is pedaling, and then holding the lever in that position, causes the derailleur to continuously shift to either lower or higher ratios through its entire ratio range. The derailleur stops moving when the drive cylinder 56 has reached the inner or outer ends of its stroke.

The DOWN shifting lever, operating through a pivoted cam link or links, drives the piston in pumping cylinder 158 of the control unit approximately 0.25" in its bore, while the UP shift lever drives the piston approximately 0.38" in its bore. Even though both shift control levers actuate the same piston pump, the control levers are independent, and movement of one lever does not cause the other to move.

The shift control unit housing 152 provides pivot pins for attaching the cyclist-operated shifting control levers 154 and 156. Pivoted linkages containing cam surface features connect both of the shift control levers to the piston pump. Control unit housing 152 may further have adjustable stop screws to control the actuation stroke length of the shifting control levers and/or the piston pump cam linkages.

A reservoir attached to, and in fluid communication with, pump cylinder 158 has a screw-on or bayonet-style cap with a fluid level "eye" for determining the fluid level and sealing the reservoir, and also containing a fluid expansion bladder in the cap. As with control unit 100, housing 152 is preferably mounted so that the top edge of the reservoir is approximately horizontal when the bicycle is on a flat surface. In this position, the DOWN and UP shift control levers most preferably lie in a plane which is inclined approximately 20° from the horizontal, with the DOWN lever being slightly higher than the UP lever. This orientation again provides the cyclist with the greatest comfort and control when shifting the DOWN lever with the thumb, or when shifting the UP lever with the index finger.

One end of the bore of cylinder 158 has a pump discharge port and fitting for a flexible and abrasion-resistant hydraulic line which is connected to control valve assembly 138, specifically, to a port that communicates with the end of one of the spool control valves' cylindrical bore on the end opposite its return spring. Although lever shift control unit 150 can shift the front or rear derailleurs to either lower or higher drive ratios, only one hydraulic line connection to the derailleur is required.

Pumping piston 160 fits into its bore with approximately 0.002" diametral clearance, and has two circumferential O-ring seal grooves around the piston circumference. One end of the piston closest to the O-ring grooves contains a counter-bored hole for a return spring. The end face of the piston opposite the return spring hole has a machined cross-slot. A small diameter hole is drilled perpendicular to this slot in the piston for a press-fit pivot pin. A metal roller that is slightly narrower than the slot is secured to the end of piston 160 by the press-fit pivot pin. The roller can rotate on the pin, but the pin cannot rotate in the end legs of the piston. The pivot pin is longer than the diameter of the piston, and projects outward from the sides of the piston as described below.

The bore of cylinder 158 also contain a cross-slot in the end opposite the discharge end. This slot is machined through the lower wall of the pumping cylinder, and partially through the upper wall, and is slightly wider than the diameter of the pivot pin in the pumping piston. The pumping piston is assembled in cylinder 158 by first installing the return spring and piston in the cylinder. The piston is pushed far enough into the cylinder bore so that the hole for the pivot pin lines up with the cross-slot in the cylinder wall. The roller is also aligned in the end of the piston so its hole is coincident with the pivot pin hole in the piston. The pivot pin is inserted into the lower portion of the clearance slot in the cylinder, and is pressed through the lower leg of the piston, passing through the roller bore, through the upper leg of the piston, and then out into the clearance slot in the upper portion of the cylinder bore. With the pivot pin extending into both ends of the clearance slot in the cylinder walls, piston 160 is allowed to slide in and out of the cylinder bore. However, it is prevented from rotating in the bore, and is also prevented from being pushed out the end of cylinder 158 by the return spring.

The foregoing construction details of the pumping piston and cylinder may also be applied to the piston controller for the previously described HAMP derailleur system.

A second slot is also provided in the end of the cylinder bore, adjacent the pivot pin retention slot, and oriented at approximately 90° to it. This slot in the end of the cylinder bore extends from the edge of the bore approximately 0.5" toward the discharge end of cylinder 158, and is parallel to the axis of the cylinder bore. It provides clearance for the actuating cam link which pushes against the roller on the piston to drive the piston to its 0.251" and 0.375" displacements.

Pumping piston 160 would normally be pushed toward the end of its cylinder by the return spring so that the pivot pin is against the ends of slots in the upper and lower cylinder walls. At this location, the inlet port from the reservoir is uncovered. A narrow slot whose length is perpendicular to the cylinder axis is also provided in the top side of pumping cylinder 158. This slot communicates with the bottom side of the reservoir, and is the fluid entry port from the reservoir into the pumping cylinder. The inlet port is located slightly ahead of the end of the piston when the piston is in its full spring-returned position. As piston 160 moves toward the exhaust port end of the cylindrical bore, this inlet port is sealed off as the O-ring slides over it, and a fixed volume of fluid ahead of the piston in the cylinder is displaced out the exhaust port. When the piston returns to its normal position, this port is reopened, and the hydraulic shift control circuit is returned to atmospheric pressure.

A connecting link is pivotally mounted to the same pin as the thumb or DOWN shift lever, and the end of the link opposite the pin contains a cam surface that contacts the small roller at the end of pumping piston 160. The connecting cam linkage has an extension tab that engages the inside surface of the DOWN shift lever. Force and motion from the DOWN shift lever are thus transferred to the connecting link through this tab. The connecting link can be rotated independently about its pivot without rotating the DOWN shift lever, in which case the drive tab and lever surface would separate.

An adjustable screw stop is provided in controller housing 152 to control the arc of rotation of the connecting linkage and thus the stroke of piston 160. This stop controls the 0.375" stroke length of the piston. The 0.25" stroke length is controlled by an adjustable stop screw against the UP shift control lever to limit its arc of rotation.

A leaf spring is located inside the DOWN shift lever to hold it in its unactuated position. The DOWN shift lever also contains a tab projecting opposite the end operated by the cyclist. This tab contacts a mating surface on the controller housing, and functions as a spring return stop for the DOWN shift lever.

As the DOWN shift lever is pushed by the cyclist, it rotates counter-clockwise when viewed from the top, causing the connecting link to also rotate counter-clockwise. The cam surface on the connecting link that was in contact with the piston roller push on the roller, and the pumping piston is moved axially in its cylinder bore. Counter-clockwise motion of the DOWN shift lever would continue until the connecting linkage contacted the adjustable screw stop on housing 152. This motion pushes pumping piston 160 0.375" in its bore. The fluid displaced by the piston is pumped to the end of the spool control valve, and causes the spool to move 0.50". If the cyclist was pedaling and the pump was operating, flow of oil from the pump is rediverted to one of the power cylinders and causes the derailleur to begin shifting the chain to larger adjacent sprockets on the rear cassette (or smaller diameter sprockets at the pedal cranks if the left controller were operated). When the DOWN shift lever is released, the return spring in the lever and in the end of the pumping piston returns the piston, link, and control lever all back to their original positions.

The UP shift lever in the control unit mounts on a pivot pin that is on the far side of the handle bars. When the UP shift lever is actuated by the cyclist, it rotates clockwise as viewed from the top. The UP shift lever also has a tab projecting off the pivot end of the lever. This tab contains holes for mounting a small actuating roller with a pivot pin. The actuating roller would normally be in contact with a second cam surface on the connecting link described previously between its pivot point and the cam surface that contacts the piston roller. The small roller on the end of the lever will also move clockwise about the lever pivot pin. As the small roller is forced clockwise by the UP lever, it drives its connecting link in a counter-clockwise direction, causing the connecting link to separate contact at its drive tab with the DOWN shift lever, and also to push the pumping piston in its cylinder bore.

When the UP shift lever has gone through its full travel and is in contact with the adjustable stop, it would have caused the pumping piston to move 0.25" in its bore. This piston travel displaces the correct amount of hydraulic fluid to move the spool valve controlling the flow of fluid from the hydraulic pump by 0.25". If the cyclist was pedaling, and the derailleur pump was rotating, this displacement of the spool control valve would cause the derailleur to begin shifting the chain to lower ratio adjacent sprockets. When the Up shift lever were released, the piston would return to its original position along with the connecting link and the Up shift control lever.

Figure 10A:
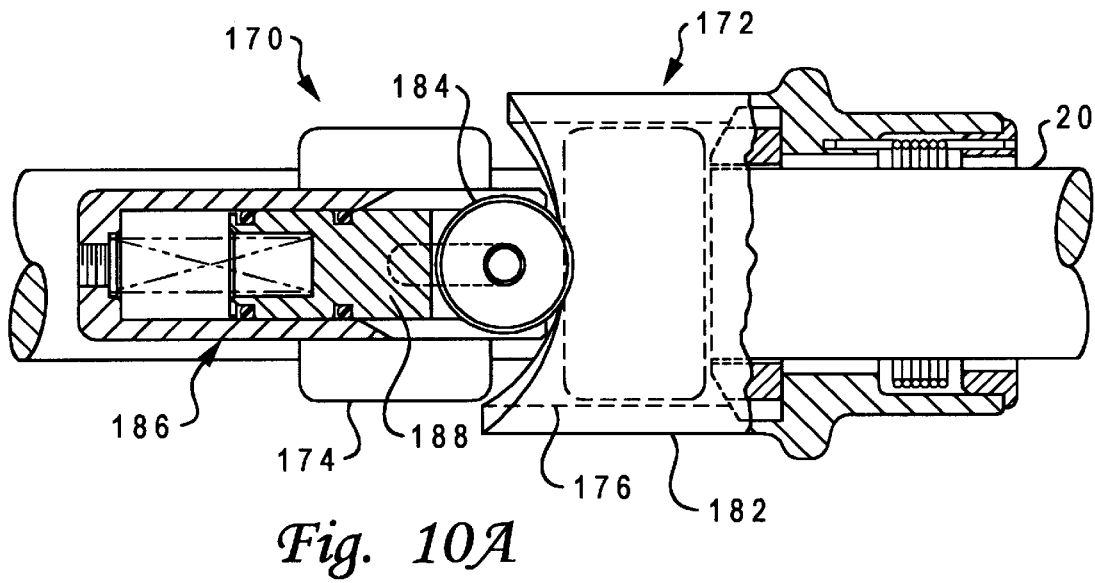
Figure 10B:
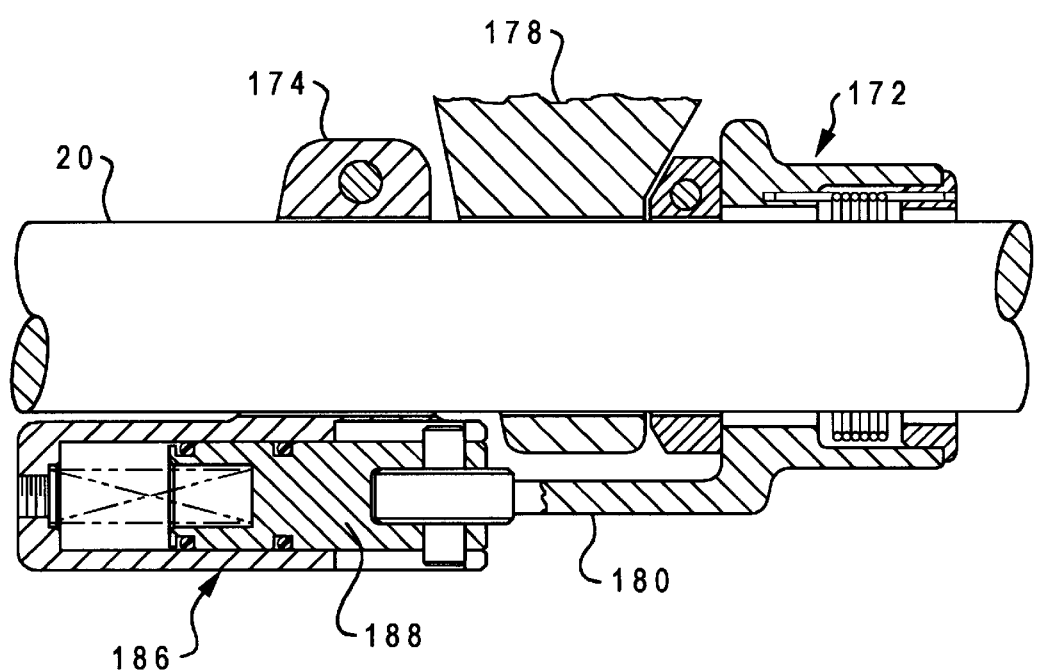
FIG. 10B is a top plan view and partial cross-section of the same shifting control unit.

The second suggested design 170 of a shift control device for HAPA system 130 is illustrated in FIGS. 10A and 10B. The twist grip shift control device 170 includes a short length, rotatable, tubular grip 172 that is concentric about the axis of handle bar 20, and is optionally larger in diameter than standard (non-movable) handle bar grips. Twist grip 172 is preferably positioned between the inside end of such a stationary grip and a brake lever clamp strap. Grip 172 can be twisted or rotated clockwise or counter-clockwise approximately 45° about a spring-centered position, causing the HAPA derailleurs to shift to lower or higher drive ratios as explained below. Twisting control grip 172 in either direction while pedaling, and then holding the grip in that position against its stop, causes the derailleur to continuously shift either to lower or higher ratios all the way to the end of the derailleur stroke.

Grip 172 uses a metallic split clamp 174 and a hub tube 176 to clamp onto handle bar 20. Hub tube 176 provides a bearing surface upon which the polymeric twist grip 172 is allowed to rotate. Hub tube 176 has formed thereon two stop surfaces approximately 180° apart on its larger diameter clamping ring edge that is closest to the brake lever clamp 178. These stop surfaces engage adjustable stop blocks mounted on the inside surface of a polymeric double cam ring 180 (integrally formed with grip 172) to limit the clockwise or counter-clockwise rotation of grip 172. Approximately 0.002" clearance is provided between hub tube 176 and the inside of the grip/cam ring to facilitate smooth rotation about the hub tube. A helical torsion return spring is provided inside grip 172. A tab extending 90° from one end of this spring engages grip 172 at a hole therein that is at the base of the spring pocket, and parallel to the axis of the grip/ring. The other tab of the torsion spring engages a hole in a metallic ring that is factory press-fit onto the smaller diameter end of the metallic clamp/hub tube and up against a small shoulder on the end of tube 176. This press-fit ring serves as a mount for the spring, and also as a thrust stop for cam ring 180 to prevent it from being pushed off the hub tube by axial forces generated by the shifting cam. Rotating the grip in one direction causes the helical spring to wind up to a slightly smaller diameter, while rotating the grip in the other direction would cause the spring to unwind and have a larger diameter. Approximately 0.003"–0.004" clearance is provided between the end faces of grip 172 and the flanges of hub tube 176.

Grip 172 also has a slightly larger diameter, partial cylindrical extension 182 from its large diameter end. This cylindrical extension 182 has a circular notch in its edge, and two edge cam surfaces extending from this notch out to the sides of the segment. The diameter of the notch is the same as the diameter of the roller 184 in the shift control pump 186. The rise (measured parallel to the axis of the grip/ring) on one of the cam surfaces from the notch is approximately 0.312". The rise in the other cam surface with respect to the notch is 0.438". Each cam segment contains slightly more rise than actually required in operation to provide some adjustability on the travel of the piston that the cams will be operating.

When the grip/ring is rotated by the cyclist, these cam surfaces press against roller 184, which is mounted to a piston 188 in pump 186, causing piston 188 to be displaced in its cylinder bore. Rotating the ring in one direction until it contacts the first adjustable stop displaces the piston approximately 0.25". Rotating the ring in the opposite direction until it contacts the second stop displaces the piston approximately 0.375". The diameter, sealing means, method for mounting, inlet and outlet porting, and means for retention of pumping piston 188 in twist shift control system 170 is generally identical with the piston and cylinder means used in lever shift control system 150. Pumping piston 188 has O-ring seals, and is spring-returned against a pivot pin stop created by a cross-slot in the cylinder walls, as in the lever shift design. Roller 184 engages the edge of the partial cylindrical cam on ring 180 instead of the cam surface on the connecting linkage for the lever style controller. When piston 188 is fully spring-returned in its bore, a slot port connection between the cylinder and reservoir of pump 186 is similarly uncovered, and the cylinder is open to atmospheric pressure and to the reservoir above it.

Pump/reservoir unit 186 is positioned before clamping so that the top surface of the reservoir is horizontal when the bicycle is resting on both wheels on a horizontal surface. With the pump/reservoir unit installed as described previously, the brake levers are then installed and clamped to the handle bars. Thereafter, the grip/cam ring subassembly is slid over the end of handle bar 20 and toward the pump/reservoir assembly until the notch in the edge of the cam ring is contacting roller 184. Split clamp 174 is then tightened onto the handle bar. The non-rotating (conventional) friction grip is installed over the end of the handle bar. The inside edge of this grips is preferably in contact with the metallic retention rings on the grip/cam hubs.

Clearance is provided for passage of the edge cam on the grip/cam ring in the edge of the pumping unit cylinder by machining a slot across the front edge of the cylinder. This slot is approximately 0.125" wide by 0.50" deep in opposite walls of the open end of the cylinder, and is oriented at 90° to the slot for the piston pivot/retention pin slot previously described.

When the cyclist wishes to change the drive ratio on the bicycle, grip 172 is rotated approximately 45° in a clockwise direction (when viewed from the handle bar end) while pedaling, until the adjustable stop on the inside surface of the cam ring contacted the stopping surface on the rotatable grip hub. This would cause one of edge cam surfaces to press against the roller in the end of the piston, and displace the piston in its bore by approximately 0.25 inches. This amount of piston displacement pumps a volume of hydraulic fluid to the end of the control spool valve sufficient to displace it by 0.25" in its bore. Displacing the spool control valve in turn causes the derailleur to move to its next position as described previously. Upon sensing that the chain had shifted to its new selected ration position, the cyclist would release the grip/cam ring. The torsion spring within the ring returns the ring to its centered position. Pumping piston 188 is pushed back out of its cylinder by its return spring, until roller 184 re-engages the notch in the center of cam ring 180.

Rotating the grip/cam ring in the counter-clockwise direction causes the opposite cam surface to contact the piston roller. Because the rise of this cam is higher than the first cam surface, piston 188 is displaced 0.375" in its bore. Movement of the piston caused by the steeper cam displaces a greater volume of hydraulic fluid, and causes the corresponding control valve spool to be displaced by 0.500". Fluid flow from the pump is thus diverted to the derailleur cylinder causing the derailleur to move the chain to the next desired sprocket position. When the cyclist sensed that the shifting operation had been completed, the grip ring is again released, and all components spring-return to their original positions.

Figure 11B:
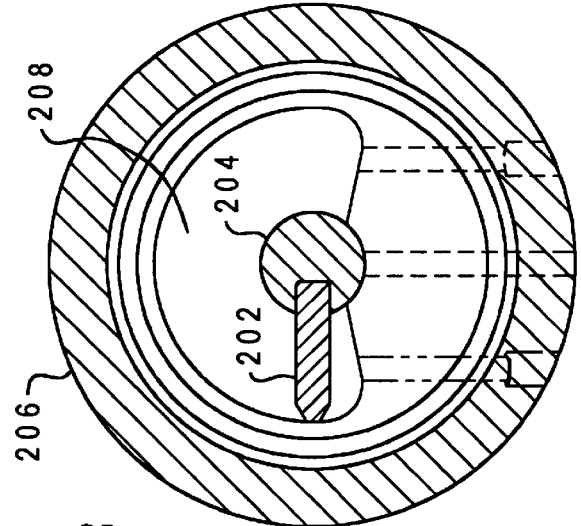
FIG. 11B is a sectional view taken along lines 11B–11B of FIG. 11A.
Figure 11C:
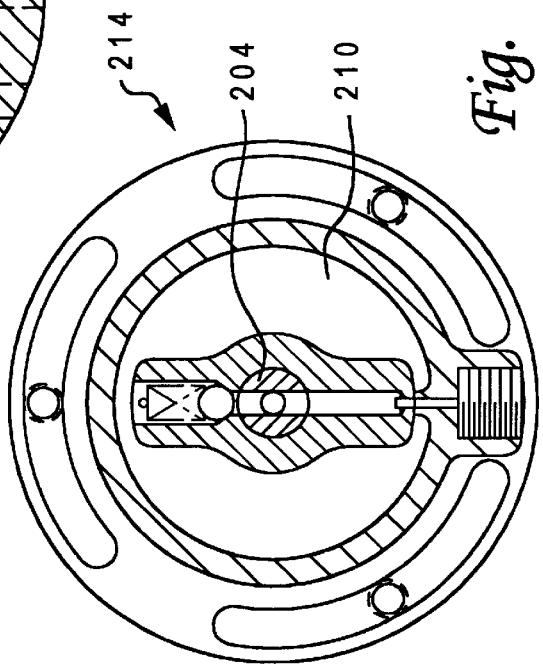
FIG. 11C is a sectional view taken along lines 11C—11C of FIG. 11A.
Figure 11A:
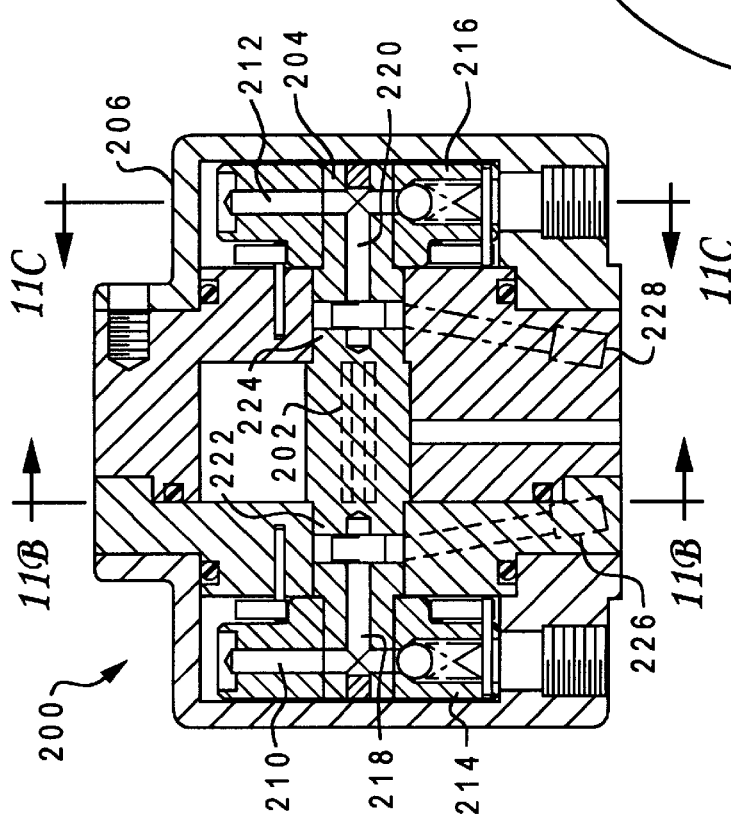

The HAPA derailleur shifting system can be further upgraded to provide automatic shifting, by replacing a shift control device (150 or 170) with the pedal speed-sensing servo valve 200 illustrated in FIGS. 11A–11C. Servo valve 200 is particularly designed to control the operation of the rear derailleur 32. A slightly different spool control valve arrangement may be used, wherein the spool for the rear derailleur is actuated the same distance from both ends about a central normal position. With servo valve 200 and the replacement spool control valve, the rear derailleur automatically shifts to lower or higher drive ratios when the pedaling speed falls below a minimum level set by the cyclist, or exceeds a maximum selected speed. Servo valve 200 can be mounted at any location on the bicycle including the handle bar, and has two small hydraulic lines connecting it to both ends of the spool control valve for the rear derailleur. Servo valve 200 also has a pressure line from the pump and return line back to the inlet of the spool control valve assembly or the reservoir. This automatic version of the HAPA system otherwise utilizes all the same components as the previously describe manually-controlled HAPA system, including the inclined linear slide derailleurs and actuators, chain idler mechanisms, and controller for the front derailleur.

In the depicted embodiment, automatic shift servo valve 200 is comprised of a central rotary-motion, hydraulic fluid, flow rate sensing vane 202 mounted on a pivot shaft 204, that operates in a housing 206 containing a flat-ended, half-cylindrical chamber 208 that is slightly larger in radius than the effective radius of vane 202. The axis of the half-cylindrical chamber 208 is aligned with the axis of rotation of vane 202, but slightly offset (0.005" to 0.010") from the vane axis. The offset is in a direction along a diameter of the chamber beginning at 0° in the half circle and ending at 180° in the half circle. The height of half-cylindrical chamber 208 is also slightly greater (0.0005" to 0.001") than the width of the vane that operates inside of the chamber.

Chamber 208 contains a smaller diameter cylindrical section that is positioned opposite the larger diameter portion of the chamber. The diameter of this section is slightly larger (0.0005" to 0.001") in diameter than the back side of the portion of the shaft opposite sensing vane 202. The clearance transition between the opposing cylindrical sections of the chamber contains hydraulic inlet and exhaust ports to allow fluid to flow into one side of the chamber on one side of the vane, and to flow out the other side of the chamber on the opposite side of the vane.

With the vane assembled in the chamber and located at one side of the chamber adjacent the inlet port and at a 0° reference position, the tip of vane 202 is approximately 0.001" to 0.002" away from the cylindrical surface of chamber 208. Minimal clearance is preferably provided between the sides of the vane and the flat ends of the chamber, and also between the vane shaft and the housing, to enable the vane to freely rotate 180° in the chamber. As the vane rotates toward a position that is 180° opposite to the original position (and toward the discharge end of the chamber), the spacing between the tip of the vane and the inside surface of the cylindrical chamber increases, due to the fact that the chamber and vane centerlines are offset. If the tip of the vane were to reach the opposite (discharge) side of the chamber, it would be spaced approximately 0.01" to 0.02" away from the inside circular wall of the chamber.

Opposite ends of vane shaft 204 extend from the central chamber 208 into chambers 210 and 212 that are on each side of the central chamber and that have different shapes and purposes. One of the purposes of these two identical chambers outboard from the central chamber is to provide a mounting means for two flat wire, very low spring rate torsional "clock" springs. One end of each of these springs is anchored to the side wall of the outside chambers with a pin. The other end of each spring is attached to the back side of discs that are mounted to the ends of vane shaft 204, and that operate in each outside chamber 210, 212. Each of the flat wire torsion springs provides a torsional spring force to vane shaft 204 and vane 202 that tends to position vane 202 at the end of its travel in chamber 208 adjacent the inlet port, or at the 0° position. In this position, clearance between the vane tip and the inside wall of chamber 208 is at its minimum. As vane 202 is rotated in the chamber, it moves against a slightly increasing torsional spring preload. This torsional preload is maximum when vane 202 is fully rotated to the opposite side of chamber 208 adjacent the fluid discharge port, where the tip spacing is maximum.

The HAPA rear derailleur hydraulic pump 136 previously described is driven by the bicycle chain and thus by rotation of the pedal cranks. The greater the speed of the pedal cranks, the greater the flow of hydraulic fluid from pump 136. Thus, in addition to providing pressurized fluid for actuating the derailleurs, pump 136 can also be used to determine the speed of rotation of the pedals by measuring the flow rate from pump 136, which is approximately proportional to pedaling speed. When hydraulic fluid from the derailleur-mounted pump 136 enters sensing chamber 208 of servo valve 200 through the inlet port, it flows against one side of vane 202, through the space between the tip of the vane and the chamber, and then flows out the other side of chamber 208 through the discharge port. If the flow of fluid from the pump were small, then the area between the tip of the vane and the chamber wall would be sufficient to allow the fluid to pass through without excessive pressure building up against the face of the vane. However, when the fluid flow from the pump (pedaling speed) increases, the spacing between the vane tip and chamber wall is not adequate to allow the fluid to pass without pressure building up against the back side of the vane. This pressure build up causes vane 202 to rotate in chamber 208 to another position, to increase the flow area at the tip of the vane and balance the pressure against the vane with the torsional spring preload on the vane. In this way, the angular position of the vane in the sensing chamber is roughly proportional to the speed that the pedal cranks are being rotated by the cyclist.

The angular rotation of the vane against the flow of fluid from pump 136 is used to operate two adjustable pressure signal generating devices 214 and 216 that are located on each side of the flow sensing chamber in automatic shift control servo 200. These two signal generating devices control the operation of the derailleur spool control valves by sending pressure signals to the ends of the spools causing them to shift in their bores and redirect fluid flow to an actuator cylinder 56. As noted above, the output shaft extensions from sensing vane 202 each enter one of the two sealed signal generating chambers 210, 212 in signal generating devices 214 and 216. Narrow discs (approximately 0.3" thick) are permanently mounted on the ends of each shaft extension, and are free to rotate inside chambers 210 and 212. As stated previously, these discs contain the means for mounting the torsional return springs for vane 202. The rim of these discs have a single narrow slot approximately 0.02" wide and 0.25" long, with the narrow axis of the slots aligned to the centerline of shaft 204. These slots are also radially aligned with the tip of the sensing vane. In other words, a plane passing through the long dimension of each slot would also pass through the center of the shaft, and bisect the thickness of the vane at its tip. These slots communicate to a hole that is drilled along a diameter of the disc from its opposite edge. This hole has counter-drilled and tapped sections for a ball check valve, preload spring, and a spring retainer hollow set screw or pin.

Each shaft extension also contains a hole drilled axially along its center, and extending from each end of shaft 204 partially toward the vane mounting hub. These holes 218 and 220 intersect the previously described radially drilled holes along the centerline of each disc. The ends of the holes are plugged by press-fit steel balls. Cross-drilled holes in each end of the shaft connect with radial grooves located approximately at the center of bearing journal sections 222 and 224. Bearing journals 222 and 224 are located between the sensing chamber and the two outboard shift signal generating chambers. Two more holes 226 and 228 are drilled into housing 206 in alignment with the radial grooves in the shaft, and connect to other hydraulic ports in a manner described below. The clearance between the vane shaft and journal bearing is small (0.0005" to 0.001") to prevent significant leakage along the journal bearing and into the vane or shift signal generating chambers.

Hydraulic fluid can enter each of the ports in the housing at the bearing journals on the vane shaft between central chamber and the two outboard signal generating chambers. Fluid flows from these inlet holes 226 and 228, into the radial grooves in the vane shaft, into the cross-drilled holes, along the holes 218 and 220 in the center of shaft 204 to where they intersected with the cross-drilled holes in the discs, then radially outward along the cross-drilled holes opposite the ball and spring valves in the discs, and out the discharge slots. If fluid were prevented from flowing out one of the slots, it would lift the pressure relief ball off of its seat against the spring preload in the opposite side of the disc, and flow out around the ball and spring to the opposite side of the disc.

The chambers in which both discs operate contain a cup-shaped cover portion that is attached to the main servo valve housing 206 by fasteners through circumferential slots in the edge of the cups. An O-ring circumferential seal is provided in the face of the cup or servo valve housing to prevent leakage of hydraulic fluid across the face of the cup and to the outside of the servo valve assembly. With the clamping and sealing arrangement described, the cup could be rotated and clamped to the housing to different angular orientations with respect to the housing.

The inside cylindrical surface of the cup is larger in diameter than that of the spring mounting disc by approximately 0.1" to 0.15". Located on this inside cylindrical surface is an inward projection that is the same width as the thickness of the spring mounting disc (described previously as 0.30"). The projection extends or occupies approximate 30° of the inside circumference of the cup. The top or inward most surface of this projection is cylindrical and has a radius from the center of the cup that is approximately 0.001" to 0.002" larger than the radius of the spring mounting disc. A recess that is approximately 0.06" deep is provided in the concave surface of this inward projection. The recess occupies all of the cylindrical surface area of the projection with the exception of a narrow lip (approximately 0.02" wide) that runs around the full perimeter of the recess. The edge surface of this lip is at the radius (from the center of the cup) of the original inward projecting concave cylindrical surface, or 0.001" to 0.002" larger than the radius of the spring mounting disc that rotates inside the cup. The recess is connected to the outside surface of the rotatable cup with a drilled port. The point at which this port exits the outer surface of the cup contains a hydraulic fitting for connection of a small flexible hydraulic line that connects to one end of the spool control valve in the rear derailleur.

In operation within its sealed cup, each disc is able to freely rotate in its chamber under the influence of the flow sensing vane. The clearance between the edge of the discs and the inside cylindrical surface of the rotatable cup is 0.05" to 0.075". In the region of the inwardly projecting cylindrical surface containing the recess and rimmed edge, the clearance between the edge of the disc and the edge of the rim around the recess is approximately 0.001" to 0.002". Approximately 0.05" clearance exists between the flat inside surface of each cup and the outside flat surface of each disc, as well as between the inside flat surface of the discs, and the outside flat surface of the central vane housing. Each of the chambers containing the spring mounting discs also has a fluid discharge port that is drilled into the housing side of each outboard chamber. The discharge ports are connected to other porting in the pedal speed sensing servo valve 200 as described below.

Fluid enters the servo valve assembly and flows into the central shaft of the signal generating chamber for the first spool side of the rear derailleur spool control valve, between the vane chamber and the shift signal chamber. It then flows outward to the disc along the shaft, radially outward to the slot in the edge of the disc, and into the signal generating chamber inside the rotatable cup. Since this chamber is sealed, the fluid being expelled from the slot in the disc fills the chamber and exits the chamber out the discharge port. This discharge port is in turn connected to the journal bearing inlet port for the other signal generating chamber. Fluid discharge from the first chamber would similarly enter the flow through the second chamber and out its discharge port in the end of the housing. From that discharge port, fluid travels to the inlet port side of the speed sensing vane chamber, flows around the tip of the vane, and cause the vane to rotate to a position where the flow through the area at the tip of the vane and resulting pressure generated against its first surface is in balance with the torsional spring preload working to return the vane to its original position. Fluid in the vane chamber flows back to the reservoir. Since both the shift signal chambers and the flow sensing chamber are hydraulically sealed to one another, only a minute amount of leakage occurs between the chambers. Additionally, all the chambers are sealed to the outside of the servo valve housing. Therefore essentially all the fluid entering servo valve 200 flows through each of the chambers without leaking between chambers.

The maximum pressure required to displace vane 202 180° in its chamber against the maximum fluid flow condition from the pump is significantly less than the pressure required to move the corresponding spool in the rear derailleur control valve. Additionally, the hydraulic connections from each signal generating chamber 210, 212 to the ends of the spool control valves are sealed, and no fluid is lost through these circuits. When the spool returns to its central position, fluid flows back into the sensing chamber through a leakage path between the edge of the spring mount discs and the rim of the inward projection in the chamber.

The hydraulic line from one signal chamber is connected to an end of the spool that, when pushed by hydraulic pressure, causes the derailleur to shift the chain toward larger diameter rear sprockets. The hydraulic line from the other signal chamber is connected to the other end of that spool valve so that, when pressurized, the spool moves in the opposite direction, and shifts the chain to smaller diameter rear sprockets. Thus the first chamber acts as an automatic DOWN lever, and the second chamber acts as an automatic UP lever.

The first cup (for controlling shifting to larger diameter rear sprockets) is aligned so that the rimmed pocket or recess in the inside diameter of the cup is over the slot in the first disc, when vane 202 is fully spring-returned to its position in flow sensing chamber 208 (where the distance from the tip of the vane to the internal cylindrical surface of the chamber is minimum). The second cup (for shifting to smaller diameter sprockets) is aligned so that the rimmed pocket of recess is over the slot in the second disc when the vane is at the maximum end of its travel in the flow sensing chamber (where the distance from the tip of the vane to the internal cylindrical surface of the chamber is maximum).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the novel hydraulic derailleur system designs are intended primarily for mountain bicycles, they also have characteristics that are desirable for road bicycles. Also, power-assisted shifting systems may be especially useful on tandem bicycles since the control line runs on the bicycle frame are much longer than for a single bike, and reduced tubing and additional hydraulic fluid could be an advantage. It is therefore contemplated that such modifications can be made without departing from the spirit or scope of the present invention as defined in the appended claims.

I claim:

1. A system for shifting between different drive ratios on a bicycle, comprising:

means for aligning a portion of a drive chain of the bicycle with one of a plurality of sprockets attached to the bicycle, said aligning means including a hydraulic actuator having at least first and second ports, and an alignment member; and control means for selectively applying positive hydraulic pressure to one of said first and second ports such that said hydraulic actuator moves said alignment member in a first direction of decreasing gear ratios when the hydraulic pressure is applied to said first port and a hydraulic fluid enters said hydraulic actuator through said first port, and said hydraulic actuator moves said alignment member in a second direction of increasing gear ratios when the hydraulic pressure is applied to said second port and the hydraulic fluid enters said hydraulic actuator through said second port.

2. The system of claim 1 wherein said control means includes a peristaltic pump driven by a dual-roller pumping rotor, wherein said rotor is responsive to first and second, opposing ratcheted levers such that actuation of said first lever displaces pressurized hydraulic fluid into said first port of said hydraulic actuator, and actuation of said second lever displaces pressurized hydraulic fluid into said second port of said hydraulic actuator.

3. The system of claim 1 wherein said control means includes a first pumping cylinder responsive to a first lever and a second pumping cylinder responsive to a second lever, such that actuation of said first lever displaces pressurized hydraulic fluid into said first port of said hydraulic actuator, and actuation of said second lever displaces pressurized hydraulic fluid into said second port of said hydraulic actuator.

4. The system of claim 1 wherein said alignment member comprises a rear derailleur adapted to align the portion of the drive chain with the sprockets which are part of a sprocket cassette mounted on a rear wheel of the bicycle.

5. The system of claim 4 wherein:

said aligning means defines a shifting path which is linear and inclined with respect to a common axis of the sprockets; and said control means moves said alignment member along said shifting path using said hydraulic actuator.

6. The system of claim 4 wherein said control means includes:

a hydraulic pump; and means for selectively applying hydraulic pressure from said pump to said hydraulic actuator.

7. The system of claim 6 wherein said hydraulic pump is coupled to an idler pulley of the bicycle which imparts slack tension to the drive chain, such that said pump operates only when the drive chain is moving.

8. The system of claim 4 wherein said control means includes:

a hydraulic pump; and means for automatically providing hydraulic pressure from said pump to said hydraulic actuator such that said aligning means moves in said first direction when pedalling speed falls below a minimum level, and said aligning means moves in said second direction when pedalling speed exceeds a maximum level.

9. The system of claim 1 wherein said alignment member comprises a front guide adapted to align the portion of the drive chain with the sprockets which are part of a sprocket cluster mounted on a pedal crankshaft of the bicycle.

10. The system of claim 9 wherein:

said aligning means defines a shifting path which is linear and inclined with respect to a common axis of the sprockets; and said control means moves said alignment member along said shifting path using said hydraulic actuator.

11. The system of claim 1 wherein:

said aligning means defines a shifting path which is linear and inclined with respect to a common axis of the sprockets; and said control means moves said alignment member along said shifting path using said hydraulic actuator.

12. The system of claim 1 wherein said control means includes:

a hydraulic pump; and means for selectively applying hydraulic pressure from said pump to said hydraulic actuator.

13. The system of claim 1 wherein said control means includes:

a hydraulic pump; and means for automatically providing hydraulic pressure from pump to said hydraulic actuator such that said alignment member moves in said first direction when pedalling speed falls below a minimum level, and said alignment member moves in said second direction when pedalling speed exceeds a maximum level.

14. The system of claim 1 wherein:

said aligning means includes a rear derailleur adapted to align a first portion of the drive chain with sprockets which are part of a sprocket cassette mounted on a rear wheel of the bicycle, said rear derailleur having a first hydraulic actuator, and a front guide adapted to align a second portion of the drive chain with sprockets which are part of a sprocket cluster mounted on a pedal crankshaft of the bicycle, said front guide having a second hydraulic actuator; and said control means includes a central hydraulic pump, and means for selectively providing hydraulic pressure from said central hydraulic pump to said first and second hydraulic actuators.

15. The system of claim 1 wherein said hydraulic actuator and said control means are sealed to prevent the entry of external contaminants.

16. The system of claim 1 wherein said hydraulic actuator includes means for facilitating priming of said control means with hydraulic fluid.

17. The system of claim 1 wherein said control means includes means for shifting said aligning means through at least two gear ratios during a single shifting operation.

18. The system of claim 1 wherein said hydraulic actuator includes means for venting excessive pressure caused by overloading of said control means.

19. The system of claim 1 wherein said hydraulic actuator includes detent means for positioning said alignment member at one of a plurality of predefined locations.

* * * * *